United States Patent
Hersch et al.

(10) Patent No.: US 7,423,778 B2
(45) Date of Patent: Sep. 9, 2008

(54) PREDICTION MODEL FOR COLOR SEPARATION, CALIBRATION AND CONTROL OF PRINTERS

(75) Inventors: Roger David Hersch, Epalinges (CH); Patrick Emmel, Pratteln (CH); Fabien Collaud, Nyon (CH)

(73) Assignee: Ecole Polytechnique Federale De Lausanne (EPFL), Lausanne (CH)

( * ) Notice: Subject to any disclaimer, the term of this patent is extended or adjusted under 35 U.S.C. 154(b) by 875 days.

(21) Appl. No.: 10/631,743

(22) Filed: Aug. 1, 2003

(65) Prior Publication Data

US 2005/0083540 A1 Apr. 21, 2005

(51) Int. Cl.
*H04N 1/60* (2006.01)
*B41J 2/04* (2006.01)

(52) U.S. Cl. .................. 358/1.9; 358/1.1; 358/504; 358/518; 347/54

(58) Field of Classification Search ................. 358/1.9, 358/1.2, 515, 504, 518, 406, 1.1, 2.1, 502, 358/3.01, 3.02, 3.06, 3.1, 3.24; 382/317; 347/5, 6, 70, 81, 54, 65, 11, 29, 31, 44, 45, 347/80
See application file for complete search history.

(56) References Cited

U.S. PATENT DOCUMENTS

| | | | |
|---|---|---|---|
| 4,852,485 A | 8/1989 | Brunner | |
| 5,031,534 A | 7/1991 | Brunner | |
| 5,402,253 A | 3/1995 | Seki | |
| 5,502,579 A | 3/1996 | Kita et al. | |
| 5,508,827 A | 4/1996 | Po-Chieh | |
| 5,734,800 A | 3/1998 | Herbert | |
| 5,933,578 A * | 8/1999 | Van de Capelle et al. | 358/1.9 |
| 5,936,749 A | 8/1999 | Ikeda | |
| 6,421,140 B1 * | 7/2002 | Hui | 358/1.9 |
| 6,505,557 B2 * | 1/2003 | Desaulniers et al. | 101/487 |
| 6,527,356 B1 * | 3/2003 | Spurr et al. | 347/16 |
| 6,611,357 B2 * | 8/2003 | Wendt et al. | 358/1.9 |
| 6,671,050 B2 * | 12/2003 | Sugiyama et al. | 356/405 |
| 6,810,810 B2 * | 11/2004 | Anweiler et al. | 101/484 |
| 7,075,643 B2 * | 7/2006 | Holub | 356/326 |

OTHER PUBLICATIONS

U.S. Appl. No. 10/440,355, filed Jun. 19, 2003, R.D. Hersch, P. Emmel, F. Collaud.

(Continued)

*Primary Examiner*—King Poon
*Assistant Examiner*—Steven Kau

(57) ABSTRACT

The present invention facilitates the calibration of printers and the color separation of input images into a set of inks by disclosing methods and systems for populating device-calibration lookup tables. The disclosed methods and systems rely on a comprehensive spectral prediction model predicting at a high accuracy the reflectance spectra of halftone ink patches. The spectral prediction model is composed of a first part predicting the reflection spectra as a function of physical (mechanical) surface coverages and of a second part comprising functions mapping nominal surface coverages to effective surface coverages for halftone patch wedges printed alone and halftone patch wedges printed in superposition with one or several solid inks. In addition, the disclosed methods and systems can be used to control printer actuation parameters in different types of printers e.g. liquid ink professional printers (offset, gravure, letterpress), electrophotographic printers, ink-jet printers, Thermal transfer printers and dye-sublimation printers.

6 Claims, 6 Drawing Sheets

OTHER PUBLICATIONS

A.U. Agar, Model Based Separation for CMYKcm Printing, Proceedings of The Ninth IS&T/SID Color Imaging Conference, Scottsdale, AZ, 2001, 298-302.

S. Chosson, R.D. Hersch, "Visually-based color space tetrahedrizations for printing with custom inks", Proc. SPIE, Color Imaging: Device-Independent Color, Color Hardcopy, and Graphic Arts VI, Jan. 2001, San Jose, SPIE vol. 4300, 81-92.

F. R. Clapper and J. A. C. Yule, The Effect of Multiple Internal Reflections on the Densities of Half-tone Prints on Paper, Journal of the Optical Society of America, vol. 43, No. 7, Jul. 1953, pp. 600-603.

M.E. Demichel, Procédé, vol. 26, 1924, 17-21, 26-27 and D.R. Wyble, R.S. Berns, "A Critical Review of Spectral Models Applied to Binary Color Printing", Journal of Color Research and Application, vol. 25, No. 1, Feb. 2000, 4-19.

Output Hardcopy Devices, edited by R.C. Durbeck and S. Sherr, Academic Press, 1988, Chapter 10, Electrophotographic Printing. A.B. Jaffe, D.M. Burland, pp. 221-260, Chapter 12, Thermal Printing, D.B. Dove, O. Sahni, 277-310 and Chapter 13, Ink Jet Printing, W.L. Lloyd, H. H. Taub, 311-370.

R.D. Hersch, F. Collaud, P. Emmel, Reproducing Color Images With Embedded Metallic Patterns, Proc. SIGGRAPH 2003, Annual Conference Proceedings, ACM Trans. of Graphics, vol. 22, No. 3, to be published Jul. 27, 2003.

S. Inoue, N. Tsumara, Y. Miyake, Measuring MTF of Paper by Sinusoidal Test Pattern Projection, Journal of Imaging Science and Technology, vol. 41, No. 6, Nov./Dec. 1997, 657-661.

D.B. Judd, Fresnel reflection of diffusely incident light, Journal of Research of the National Bureau of Standards, vol. 29, Nov. 42, 329-332.

H.R. Kang, "Color Technology for Electronic Imaging Devices", SPIE Optical Engineering Press, 1997, pp. 8-12.

H.R. Kang, "Color Technology for Electronic Imaging Devices", SPIE Optical Engineering Press, 1997, pp. 43-45, original reference: J.A.C. Yule, W.J. Nielsen, The penetration of light into paper and its effect on halftone reproductions, Proc. TAGA, vol. 3, 1951, 65-76.

H.R. Kang, Color Technology for Electronic Imaging Devices, SPIE Optical Engineering Press, 1997, pp. 55-63.

H.R. Kang, Applications of color mixing models to electronic printing, Journal of Electronic Imaging, vol. 3, No. 3, Jul. 1994, 276-287.

H. Kipphan, Handbook of Print Media, Springer-Verlag, 2001, p. 92.

H. Kipphan, Handbook of Print Media, Springer-Verlag, 2001, pp. 103-105.

P. Kubelka, "New contributions to the optics of intensely light-scattering material, part II: Non-homogeneous layers", Journal of the Optical Society of America, vol. 44, 1954, 330-335.

C. Nakamura and K. Sayanagi, Gray Component Replacement by the Neugebauer Equations, Proc. Neugebauer Memorial Seminar on Color Reproduction, SPIE vol. 1184, 1989, pp. 50-63.

S.I. Nin, J.M. Kasson, W. Plouffe, Printing CIELAB images on a CMYK printer using tri-linear interpolation, Conf. Color Copy and Graphic Arts, 1992, SPIE vol. 1670, 316-324.

W.H. Press, B.P. Flannery, S.A. Teukolsky, W.T. Fetterling, Numerical Recipes, Cambridge University Press, 1st edition, 1988, section 10.5, pp. 309-317.

G. Rogers, "A Generalized Clapper-Yule Model of Halftone Reflectance", Journal of Color Research and Application, vol. 25, No. 6, Dec. 2000, 402-407.

J.L. Saunderson, Calculation of the color pigmented plastics, Journal of the Optical Society of America, vol. 32, 1942, 727-736.

A. Stanton, G. Raencic, Ink Trapping and Colorimetric Variation, Proc. TAGA 2001, 258-281.

E.J. Stollnitz, V. Ostromoukhov, D.Salesin, Reproducing Color Images Using Custom Inks, Proc. of SIGGRAPH 98, in Computer Graphics Proceedings, Annual Conference Series, 1998, 267-274.

D.R. Wyble, R.S. Berns, A Critical Review of Spectral Models Applied to Binary Color Printing, Journal of Color Research and Application, vol. 25, No. 1, Feb. 2000, 4-19.

J.A.C. Yule, Principles of Color Reproduction, J. Wiley, 1967, Chapter 11, Four-Color Printing and the Black Printer, 282-303.

* cited by examiner

PREDICTION MODEL FOR COLOR SEPARATION, CALIBRATION AND CONTROL OF PRINTERS

BACKGROUND OF THE INVENTION

The present invention relates generally to the field of printing and specifically to color separation, calibration and control of printer actuation parameters. It discloses a new comprehensive model for predicting the color of patches printed with standard and/or non-standard inks. It represents an improvement over an initial model (see U.S. patent application Ser. No. 10/440,355, "Reproduction of Security Documents and Color Images with Metallic Inks, filed 19th of Jun. 2003, inventors R. D. Hersch, P. Emmel, F. Collaud, and the paper "Reproducing Color Images With Embedded Metallic Patterns" by R. D. Hersch, F. Collaud, P. Emmel, Siggraph 2003 Annual Conference Proceedings, ACM Trans. of Graphics, Vol 22, No. 3, to be published 27th of Jul. 2003), which is used in the context of printing with metallic inks.

Being able to calibrate and control printers and printing presses is a challenge, since until now no comprehensive model exists which is capable of predicting accurately the spectra of polychrome color patches printed on paper. Existing methods for color printer characterization and calibration rely either on experimental approaches which require the measurement of hundreds of patches in order to create a correspondence between input colorimetric values (e.g. CIE-XYZ or CIE-LAB) and ink coverage values, or they rely on model-based, partly empirical methods. In respect to experimental approaches, the correspondence between input colorimetric values (e.g. CIE-XYZ or CIE-LAB) and ink surface coverages can be established by regression methods (see H. R. Kang, Color Technology for Electronic Imaging Devices, SPIE Optical Engineering Press, 1997, pp. 55-63) or by interpolation in 3D space (see S. I. Nin, J. M. Kasson, W. Plouffe, Printing CIELAB images on a CMYK printer using tri-linear interpolation, Conf. Color Copy and Graphic Arts, 1992, SPIE Vol. 1670, 316-324).

Model-based methods include the spectral Neugebauer model which predicts the reflection spectrum $R(\lambda)$ of a color halftone patch as the weighted sum of the reflection spectra $R_i$ of its individual colorants, where the weighting factors are their fractional area coverages $a_i$ (H. R. Kang, "Color Technology for Electronic Imaging Devices", SPIE Optical Engineering Press, 1997, pp. 8-12, hereinafter referenced as the "Neugebauer model").

$$R(\lambda) = \sum_i a_i \cdot R_i(\lambda) \tag{1}$$

In the case of independently printed cyan, magenta and yellow inks of respective coverages c, m, y, the fractional area coverages of the individual colorants are closely approximated by the Demichel equations which give the probability of a point to be located within a given colorant area (see M. E. Demichel, Procidt, Vol. 26, 1924, 17-21, 26-27 and D. R. Wyble, R. S. Berns, "A Critical Review of Spectral Models Applied to Binary Color Printing", Journal of Color Research and Application, Vol. 25, No. 1, February 2000, 4-19):

white: $a_w = (1-c) \cdot (1-m) \cdot (1-y)$ cyan: $a_c = c \cdot (1-m) \cdot (1-y)$ magenta: $a_m = (1-c) \cdot m \cdot (1-y)$ yellow: $a_y = (1-c) \cdot (1-m) \cdot y$ red: $a_r = (1-c) \cdot m \cdot y$ green: $a_g = c \cdot (1-m) \cdot y$ blue: $a_b = c \cdot m \cdot (1-y)$ black: $a_k = c \cdot m \cdot y$ \hfill (2)

where $a_w, a_c, a_m, a_y, a_r, a_g, a_b, a_k$ are the respective fractional areas of the colorants white, cyan, magenta, yellow, red (superposition of magenta and yellow), green (superposition of yellow and cyan), blue (superposition of magenta and cyan) and black (superposition of cyan, magenta and yellow).

Since the Neugebauer model does not take explicitly into account the propagation of light due to internal reflections (Fresnel reflections) at the paper-air interface, its predictions are not accurate (see H. R. Kang, Applications of color mixing models to electronic printing, Journal of Electronic Imaging, Vol. 3, No. 3, July 1994, 276-287). Yule and Nielsen (see H. R. Kang, "Color Technology for Electronic Imaging Devices", SPIE Optical Engineering Press, 1997, pp. 43-45, original reference: J. A. C. Yule, W. J. Nielsen, The penetration of light into paper and its effect on halftone reproductions, Roc. TAGA, Vol. 3, 1951, 65-76) expanded the Neugebauer model by modelling the non-linear relationship between colorant reflection spectra and predicted reflectance by an empirical power function, whose exponent n is fitted according to a limited set of measured patch reflectances.

$$R_{tot}(\lambda) = \left( \sum_i a_i \cdot R_i(\lambda)^{\frac{1}{n}} \right)^n \tag{3}$$

While offering a better accuracy than other existing models (see H. R. Kang, Applications of color mixing models to electronic printing, Journal of Electronic Imaging, Vol. 3, No. 3, July 1994, 276-287), the Yule-Nielsen model does not incorporate explicit variables for the ink transmission spectra and therefore it cannot be used to predict relative ink thickness values.

In the prior art, the control of printer actuation parameters affecting the printed output such as the effective dot size or the ink thickness, are carried out by means which are completely independent of the printer calibration. Ink thickness in printing presses is generally controlled by relying on density measurements of solid ink or halftone patches. For example, U.S. Pat. No. 4,852,485 (Method of operating an autotypical color offset machine, Inventor F. Brunner, issued Aug. 1, 1989) teaches a method to regulate the feeding of inks in a printing machine by relying on density measurements. As another example, U.S. Pat. No. 5,031,534 (Method and apparatus for setting up for a given print specification defined by a binary value representing solid color density and dot gain in an autotype printing run, inventor F. Brunner, issued Jul. 16, 1991) teaches a method for establishing a print specification relying on a selected solid color density and a dot gain value, the dot gain value also being obtained by densitometric measurements.

In respect to printing with non-standard inks, such as Pantone inks, U.S. Pat. No. 5,734,800 (Six color process system, inventor R. Herbert, issued Mar. 31, 1998) teaches a method for printing with fluorescent inks. However that method implies a large number (many hundreds) of measurements of patches printed with the combinations of the basic inks at different coverages. These measurements allow to build a lookup table converting between CIE-XYZ values and coverages of selected inks. In contrast, the comprehensive spectral prediction model disclosed in the present invention can be used to carry out the color separation and determine the amounts of non-standard inks which need to be printed in order to yield a desired CIE-XYZ calorimetric value. Relying on the comprehensive spectral prediction model allows to reduce considerably the number of measured patches.

The present invention discloses a new spectral prediction model which relies on a weighted average between one part behaving as the Clapper-Yule model (see F. R. Clapper and J. A. C. Yule, The Effect of Multiple Internal Reflections on the Densities of Half-tone Prints on Paper, Journal of the Optical Society of America, Volume 43, Number 7, July 1953, pp. 600-603) and another part behaving as the spectral Neugebauer model, extended to include multiple internal reflections at the paper-air boundary (Saunderson correction: see J. L. Saunderson, Calculation of the color pigmented plastics, Journal of the Optical Society of America, Vol. 32, 1942, 727-736). In addition, the disclosed comprehensive spectral prediction model includes new methods for computing the physical (mechanical) dot surface coverage, hereinafter also called effective surface coverage.

In the disclosed comprehensive spectral prediction model, physical dot surface coverages and ink transmittances are explicit elements of the model. It becomes therefore possible, according to Beer's law, to deduce from two transmittances the corresponding increase or reduction in ink thickness. Ink thickness is an important print parameter for the control of the flow of ink in printers.

In addition, the disclosed comprehensive spectral prediction model is useful for printer calibration, i.e. for establishing a correspondence between input calorimetric values (e.g. CIE-XYZ or CIE-LAB) and ink coverage values. In respect to state of the art printer calibration methods, calibration methods relying on the disclosed spectral prediction model need only a limited set of measured patches (e.g. 44 patches when printing with 3 inks). Recalibration, which is required when another type of paper is used, or when a slightly different set of inks is used, becomes a simple operation.

Finally, since the disclosed spectral prediction model can predict the color of the superposition of standard and non-standard inks, it may be used to carry out the color separation when printing with non-standard inks, such as Pantone inks. It may also be used for controlling the printer when printing with non-standard inks.

SUMMARY

The present invention facilitates the calibration of printers and the color separation of input images into a set of inks by disclosing methods and systems for populating device-calibration lookup tables. A comprehensive spectral prediction model is used which is capable of predicting at a high accuracy the reflectance spectra of halftone ink patches. The comprehensive spectral prediction model is composed by a first part predicting the reflection spectra as a function of physical (mechanical) surface coverages and by a second part comprising functions mapping nominal surface coverages to effective surface coverages. These mapping functions are calibrated by halftone patch wedges printed alone and by halftone patch wedges printed in superposition with one or several solid inks. The comprehensive spectral prediction model comprises therefore separate mappings for wedges printed alone, for wedges printed in superposition with a second solid ink and possibly for wedges printed in superposition with more than two inks. For the computation of the effective ink coverages of a polychromatic halftone patch, the different mappings are weighted according to the respective relative surfaces of the different ink superposition conditions within that polychromatic halftone patch. The part predicting the reflection spectra comprises a weighted average of two reflection spectra predicting components, one component predicting reflection spectra by assuming that light exits from the same colorant as the colorant from which it enters and one component predicting reflection spectra by assuming that light components may exit from any colorant. The disclosed methods and systems may perform the color separation as well as the calibration of printers printing with standard cyan, magenta, and yellow inks as well as with inks comprising standard and non-standard inks such as Pantone inks or any other custom inks. They are also used for performing precise undercolour removal in order to color separate images into cyan, magenta, yellow and black inks. They may further be used to color separate images into cyan, magenta, yellow, black, light cyan and light magenta inks.

The disclosed methods and systems may be used for printer control, i.e. to control printer actuation parameters such as the ink flow, the printing speed, the pressure, and the temperature in the case of professional printing technologies (offset, gravure, letterpress) and the droplet velocity, the droplet size and the number of ejected droplets per pixel in the case of ink-jet printers. They may further be used, in the case of electrophotographic printers, to act on printer parameters controlling printer variables such as the electrostatic charge and discharge of the photoconductor (for creating the latent image to be printed), the fusing pressure, the fusing temperature and the fusing duration (for fixing the toner onto the paper). They are further useful to control parameters acting on the head element temperature profiles in the case of thermal transfer or dye sublimation printers. Printer actuation parameters are controlled by inferring from the comprehensive spectral prediction model initial values of print parameters as well as corresponding value at printing time (surface coverages, ink thicknesses) and according to their difference, increasing or decreasing printer actuation parameters.

The disclosed methods (and systems) relying on the spectral comprehensive prediction model (and on its embodiment within a module) are also useful to infer from a polychromatic halftone element embedded into a printed page the current values of print parameters. At printing time, the color coordinates of such an element are acquired by image acquisition means, for example a camera. They may be transformed into a set of colorimetric tri-stimulus values. From these colorimetric tri-stimulus values, print parameters such as ink thicknesses or surface coverages may be deduced by fitting these parameters thanks to the comprehensive spectral prediction model, with the fitting objective of predicting said calorimetric tri-stimulus values. The difference between initially computed print parameters and print parameters deduced at printing time may be used to act on the printer actuation parameters, i.e. to increase or decrease their values according to state of the art control methods (e.g. PID control).

DETAILED DESCRIPTION OF THE INVENTION

Figure 1:
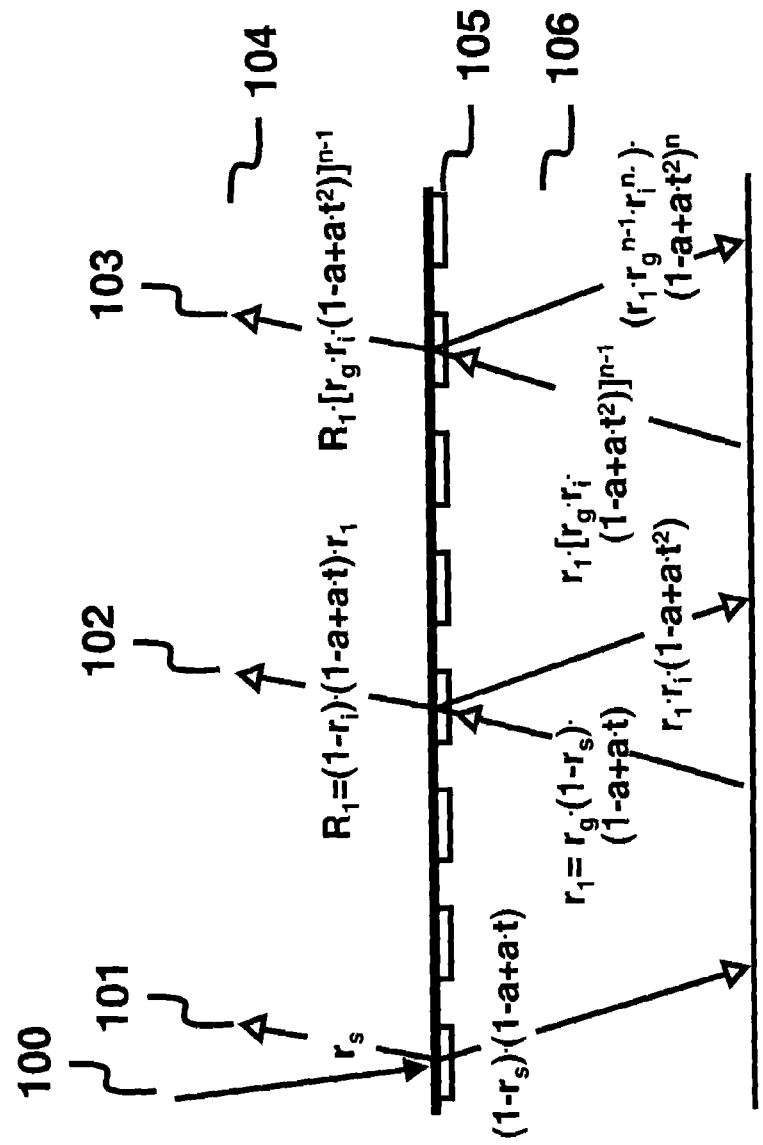
FIG. 1 shows the attenuation of light by multiple reflections on a halftone patch according to the Clapper-Yule model (prior art)

The present invention discloses methods and systems for printer calibration, for printer control and for the color separation of input images into images to be printed with standard or possibly non-standard inks.

The considered inks may be for example standard inks such as cyan, magenta, yellow and possibly black. However other inks such as orange, red, green and blue inks may also be used. For the sake of simplicity, the techniques described below are partly explained by considering the widely used cyan, magenta and yellow inks. However, these techniques also apply in a straightforward manner to transparent inks of any color. Transparent inks are inks which absorb one part of the light and transmit a second part of the light into the next layer (e.g. the substrate). They don't scatter much light back.

It should be noted that the term "ink" is used in a generic sense: it may comprise any colored matter that can be transferred onto specific locations of a substrate (e.g offset inks, ink-jet inks, toner particles, dye sublimation colorants, etc . . . ). The term standard inks refers to standard cyan, magenta, yellow and possibly black inks. The term non-standard inks refers to inks whose color differ from the color of standard inks. Examples of non-standard inks are Pantone inks, fluorescent inks, inks visible under UV light, etc. The terms "print" and "printing" in the present disclosure refer to any process for transferring an image onto a support, including by means of a lithographic, photographic, electrophotographic, magnetographic, ink-jet, dye-sublimation, thermal transfer, engraving, etching, embossing or any other process. The support may be any diffusely reflecting substrate such as paper, polymer, plastic, etc. . . .

The terms "amount of ink" and "surface coverage of ink" are used interchangeably. Generally, an initial amount of ink is specified. The halftoning (also called screening) software converts an amount of an ink into screen elements with a surface coverage equal to the desired amount of ink. Once printed, the physical size of the printed dot generally increases, partly due to the interaction between the ink and the paper and partly due to the interaction between successively printed ink layers. This phenomenon is called physical (or mechanical) dot gain. Therefore "nominal surface coverages" (or simply "nominal coverages") are initially specified amounts of the inks and "fitted surface coverages" (or simply "fitted coverages") are the effective surface coverages inferred from the spectral measurements of the printed patches according to the disclosed model, as described in detail below.

Patches which are printed with multiple, partly superposed inks are called polychromatic patches. A solid ink patch is a patch printed with 100% coverage of an ink. A halftone patch wedge or simply a wedge is formed by patches printed at different nominal surface coverages such as 25%, 50% and 75% coverages.

The screen element period of a halftone screen is defined as the target resolution divided by the lineature, i.e. a lineature of 150 lpi leads to a screen element period of 16 pixels at a target resolution of 2400 pixels/inch.

The term "triplet of color coordinates" refers to a triplet of coordinates characterizing a color, in any 3D color space, such as RGB, or CIE-XYZ, or CIE-LAB. The term "colorimetric tristimulus value" also characterizes a color in a 3D color space is therefore equivalent to the term "triplet of color coordinates".

The term "device-independent colorimetric tri-stimulus value" specifies a tri-stimulus value associated to a given color in a device-independent color space, for example a CIE-XYZ triplet of values (X,Y,Z).

The comprehensive spectral prediction model disclosed below allows to predict the reflection spectra of printed color patches. Once the reflection spectrum of a patch is known, it is easy to obtain its corresponding colorimetric tri-stimulus value in the CIE-XYZ system (see H. R. Kang, Color Technology for Electronic Imaging Devices, SPIE Optical Engineering Press, 1997, pp. 8-12). Therefore, the disclosed comprehensive spectral prediction model also allows to predict the colorimetric stimulus values of printed patches.

One aim of the present invention is to calibrate a printer which prints images with a given set of inks on a substrate (paper) by populating its device calibration lookup table according to the disclosed comprehensive spectral prediction model. A second aim of the present invention is to be able to control printer actuation parameters such as the ink flow by deducing from the reflectance or from the calorimetric tri-stimulus values (e.g. CIE-XYZ) of halftone patches the surface coverages (also called dot coverages) or the thicknesses of the inks used to print the patches. Yet a further aim of the invention is to provide a method for color separation and printer calibration when printing with non-standard inks.

These goals are reached thanks to the disclosed spectral reflectance prediction model and to the disclosed method for taking into account the effective physical dot surface coverages. The term "comprehensive spectral reflectance model" comprises both parts.

Many different phenomena influence the reflection spectrum of a color patch printed on a given diffusely reflecting substrate (e.g. paper). We need to take into account the surface (Fresnel) reflection at the interface between the air and the substrate, the light scattering and reflection within the substrate (e.g. paper bulk), the internal (Fresnel) reflections at the interface between the substrate and the air. The establishment of accurate and experimentally verified prediction models is an active topic of research (see D. R. Wyble, R. S. Berns, A Critical Review of Spectral Models Applied to Binary Color Printing, Journal of Color Research and Application, Vol. 25, No. 1, February 2000, 4-19).

We address these problems by introducing a new spectral prediction model which relies on a weighted average between one component behaving as the Clapper-Yule model and another component behaving as the spectral Neugebauer model, extended to include multiple internal reflections at the paper-air boundary (Saunderson correction) and taking specifically into account effective ink coverages under varying conditions: (a) the surface coverages of single ink halftones, (b) the surface coverages of single ink halftones superposed with one solid ink and (c) the surface coverages of single ink halftones superposed with two solid inks.

With the establishment of a prediction model capable of predicting the reflection spectra of transparent inks, we can populate a device calibration 3D lookup table for establishing the correspondence between colorimetric tri-stimulus values (e.g. CIE-XYZ or CIE-LAB) and coverages of the inks (e.g. cyan, magenta, and yellow). Such a device calibration 3D lookup table allows then, by tri-linear interpolation, to very quickly infer from a colorimetric tri-stimulus value the corresponding coverages of the inks to reproduce that color. Such device calibration 3D lookup tables are present in many standard printer calibration software packages, in printer firmware and in printer drivers.

The Clapper-Yule model (see F. R. Clapper, J. A. C Yule, "The effect of multiple internal reflections on the densities of halftone prints on paper", Journal of the Optical Society of America, Vol. 43, 1953, 600-603), described in detail in the section "An improved Clapper-Yule based spectral color prediction model", models the internal reflections at the paper-air interface and assumes that lateral light propagation due to light scattering within the paper bulk is large compared with the period of the halftones. Therefore, the probability of light to exit from a given colorant is set equal to the colorant's fractional surface coverage.

Rogers' generalized Clapper-Yule model (see G. Rogers, "A Generalized Clapper-Yule Model of Halftone Reflectance", Journal of Color Research and Application, Vol. 25, No. 6, December 2000, 402-407) models lateral scattering within the paper as a point spread function and deduces the probabilities that light entering through a colorant n emerges from the coated paper through a colorant m, possibly traversing, due to multiple reflections, further intermediate colorants. However, the adequacy of this theoretical model for predicting the spectra of color offset patches needs to be proven.

Within the framework of their work on the reproduction of color images by custom inks, Stollnitz et. al. (see E. J. Stollnitz, V. Ostromoukhov, D. Salesin, "Reproducing Color Images Using Custom Inks", Proc. of SIGGRAPH 98, in Computer Graphics Proceedings, Annual Conference Series, 1998, 267-274) predict the reflection spectra of solid colorants by using Kubelka's layering model (see P. Kubelka, "New contributions to the optics of intensely light-scattering material, part II: Non-homogeneous layers", Journal of the Optical Society of America, Vol. 44, 1954, 330-335) for combining the paper layer and the ink layers. By applying Saunderson's correction (see J. L. Saunderson, "Calculation of the color pigmented plastics, Journal of the Optical Society of America", Vol. 32, 1942, 727-736) they take into account multiple reflections at the interface between the paper and the air as well as at the interface between the paper and the paper bulk. This model predicts the reflection spectra of colorant colors (solid inks and their combinations) which are then converted to CIE-XYZ tri-stimulus values used to predict the color of halftones according to the Neugebauer equations. However, since internal transmission and reflection spectra are fitted, the model may become unstable. Furthermore, since hundreds or thousands of parameters need to be fitted, model calibration requires much computer processing time.

The spectral prediction model we disclose relies on a weighted average between one component behaving as the Clapper-Yule model and another component behaving as the Neugebauer model, extended to include multiple internal reflections at the paper-air boundary (Saunderson correction). It also relies on improvements of the modellization of the effective dot coverages.

The introduced improvements are verified by comparing measured halftone patch reflection spectra and predicted reflection spectra, for 729 patches, produced by generating all combinations of inks at nominal coverages 0%, 12.5%, 25%, 37.5%, 50%, 62.5%, 75%, 87.5% and 100%. We quantify the visual quality of color halftone patch predictions by converting measured and predicted spectra first to CIE-XYZ and then to CIE-LAB (see H. R. Kang, "Color Technology for Electronic Imaging Devices", SPIE Optical Engineering Press, 1997, pp. 8-12). The Euclidian distance $\Delta E$ in CIE-LAB space gives a measure of the visually perceived distance between measured and predicted spectra.

The fitting of unknown model parameters, such as surface coverages and ink thicknesses is carried out by minimizing the sum of square differences between measured and predicted reflection spectra (e.g. a 36-component vectors). In that case, the fitting objective is given by the measured reflection spectrum. Alternately, the sum of square differences between a triplet of predicted and a triplet of desired color coordinates (for example the colorimetric tri-stimulus value associated a lookup table entry) also allows to fit unknown model parameters. In such a case, the fitting objective is given by the desired color coordinates (or calorimetric tri-stimulus value). Both approaches can be carried out, for example with a matrix manipulation software package such as Matlab or with a program implementing Powell's function minimization method (see W. H. Press, B. P. Flannery, S. A. Teukolsky, W. T. Fetterling, Numerical Recipes, Cambridge University Press, 1st edition, 1988, section 10.5, pp. 309-317).

The Basic Clapper-Yule Spectral Color Prediction Model

Among the different existing basic color prediction models (see H. R. Kang, "Applications of color mixing models to electronic printing", Journal of Electronic Imaging, Vol. 3, No. 3, July 1994, 276-287), only the Clapper-Yule model (see F. R. Clapper, J. A. C Yule, The effect of multiple internal reflections on the densities of halftone prints on paper, Journal of the Optical Society of America, Vol. 43, 1953, 600-603) takes into account simultaneously halftone patterns and multiple internal reflections occurring at the interface between the coated paper and the air.

The Clapper-Yule model and its enhancements are introduced below by considering paper as the substrate on which the inks are printed. However, any diffusely reflective substrate may be used, for example polymer or plastic. The term "paper substrate" used hereinafter refers to the part of the paper located beneath the ink layer.

For introducing the Clapper-Yule model (see FIG. 1), we consider a single halftone ink layer 105 with a fractional surface coverage a printed on a paper substrate 106. Incident light 100, which is not specularly reflected at the air-paper interface, has the probability a of reaching the paper substrate by passing through the ink (transmittance $t(\lambda)$), and a probability (1−a) of reaching the paper substrate without traversing the ink layer. Since $r_s$ is the specular surface reflection at the air-paper interface, a portion $r_s$ 101 of the light exits and only portion (1−$r_s$) actually enters the coated paper. The light reaching the paper substrate is reduced by a factor (1−$r_s$)(1−a+a t). It is diffusely reflected by the paper substrate according to the paper substrate reflectance $r_g(\lambda)$. Travelling upwards, it traverses the coated paper with a portion a traversing the ink and a portion 1−a traversing an area free of ink. It is reflected at the coated paper-air interface according to reflection factor $r_i$ (Fresnel reflection). A part (1−$r_i$) of the light denoted by 102 exits onto the air 104. At the first exit, the spectral attenuation of the incident light is therefore $(1-r_s) r_g (1-r_i) (1-a+at)^2$. The part reflected at the coated paper-air interface travels downward, is diffusely reflected by the paper and travels upwards again. At the second exit, the spectral attenuation is $(1-r_s) \cdot r_g \cdot (1-r_i) \cdot (1-a+a \cdot t)^2 \cdot (r_i \cdot r_g \cdot (1-a+a \cdot t^2))$.

With K giving the fraction of specular reflected light reaching the photospectrometer (for a 45°/0° measuring geometry, we set K=0), and by considering the light emerging after 0, 1, 2, ... ,n−1 internal reflections 103, we obtain the reflection spectrum $$R(\lambda) = K \cdot r_s + ((1-r_s) \cdot (1-r_i) \cdot r_g \cdot (1-a+a \cdot t)^2) \cdot$$
$$(1 + (r_i \cdot r_g \cdot (1-a+a \cdot t^2)) +$$
$$(r_i \cdot r_g \cdot (1-a+a \cdot t^2))^2 + \ldots + (r_i \cdot r_g \cdot (a+a \cdot t^2))^{n-1}$$

For an infinite number of emergences, we obtain $$R(\lambda) = K \cdot r_s + \frac{(1-r_s) \cdot r_g \cdot (1-r_i) \cdot (1-a+a \cdot t)^2}{1 - r_g \cdot r_i \cdot (1-a+a \cdot t^2)} \quad (4)$$

In the case of paper printed with 3 inks such as cyan, magenta and yellow, the coverages of the resulting 8 basic colorants, i.e. white (the internal transmittance $t_W$ of white, i.e. no ink is 1 at each wavelength), cyan, magenta, yellow, red, green, blue and black are obtained according to the Demichel equations (eq. 2). By inserting the relative amounts of colorants $a_i$ and their transmittances $t_i$ in equation 4, we obtain for the predicted reflectance of a color patch printed with combinations of cyan, magenta and yellow inks $$R(\lambda) = K \cdot r_s + \frac{(1-r_s) \cdot r_g \cdot (1-r_i) \cdot \left(\sum_{j=1}^{8} a_j \cdot t_j\right)^2}{1 - r_g \cdot r_i \cdot \sum_{j=1}^{8} a_j \cdot t_j^2} \quad (5)$$

Both the specular reflection $r_s$ and the internal reflection $r_i$ depend on the refraction indices of the air ($n_1=1$) and of the paper (say $n_2=1.5$ for coated paper). According to the Fresnel equations (see E. Hecht, Schaum's Outline of Optics, McGraw-Hill, 1974, Chapter 3), for collimated light at an incident angle of 45°, the specular reflection factor is $r_s=0.05$. With light diffusely reflected by the paper (Lambert radiator), the internal reflection factor is $r_i=0.6$ (see D. B. Judd, Fresnel reflection of diffusely incident light, Journal of Research of the National Bureau of Standards, Vol. 29, Nov. 42, 329-332).

To put the model into practice, we deduce from equation 4 the internal reflectance spectrum $r_g$ of a blank paper by setting the ink coverage a=0. $R_w$ is the measured blank paper reflectance.

$$r_g = \frac{R_w - K \cdot r_s}{1 + (1-K) \cdot r_i \cdot r_s + r_i \cdot R_w - r_s - r_i} \quad (6)$$

We then extract the transmittance of the individual inks and ink combinations $t_w, t_c, t_m, t_y, t_r, t_g, t_b, t_k$ by inserting in eq. 4 as $R(\lambda)$ the measured solid (100%) ink coverage reflectance $R_i$ and by setting the ink coverage a=1

$$t_i = \sqrt{\frac{R_i - K \cdot r_s}{r_g \cdot r_i \cdot (R_i - K \cdot r_s) + r_g \cdot (1-r_i) \cdot (1-r_s)}} \quad (7)$$

Figure 2:
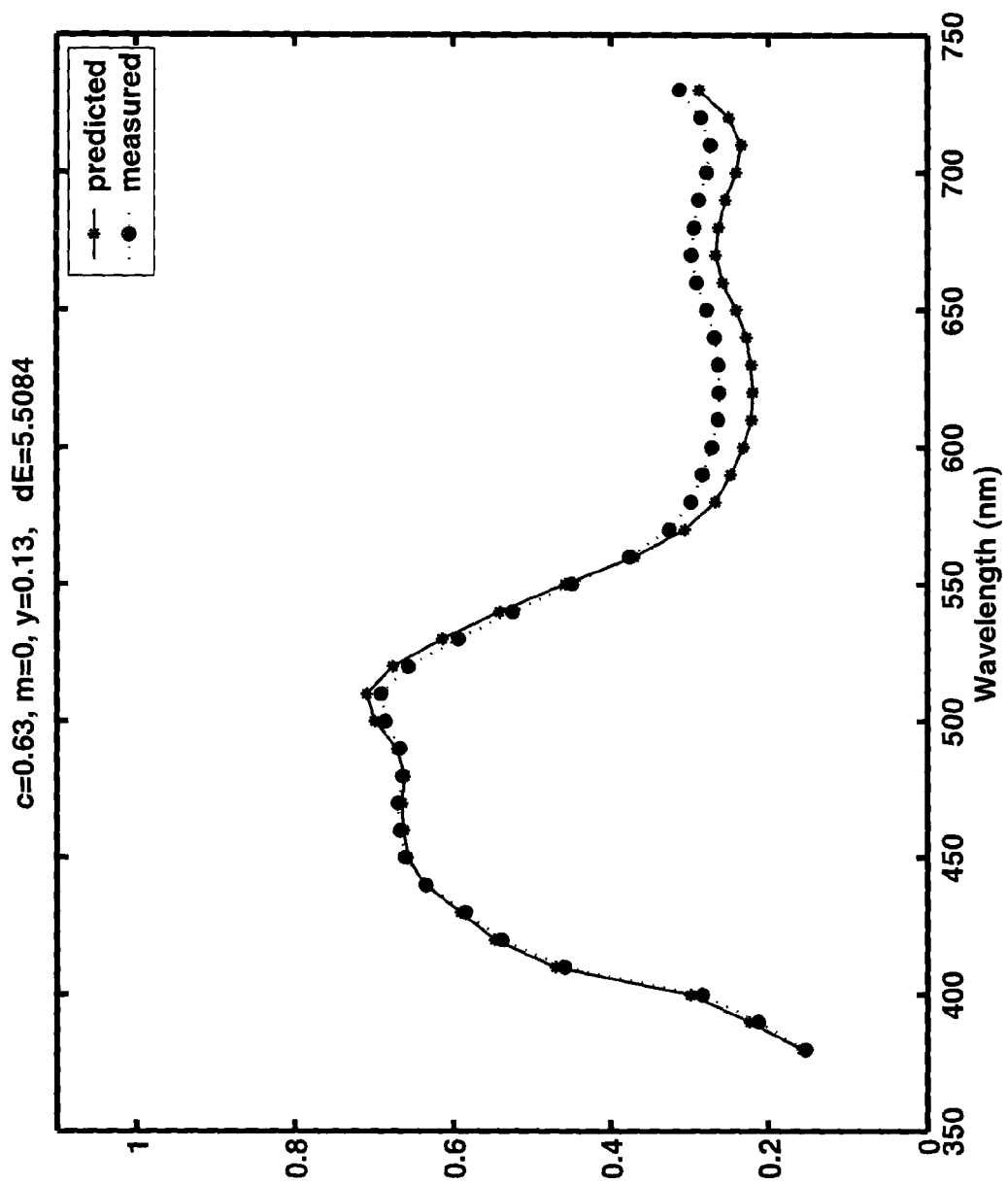
FIG. 2 shows an example of a measured (dashed line) and a predicted (continuous line) reflection spectrum according to the classical Clapper-Yule prediction model (prior art)

We must also take a possible physical dot gain into account, i.e. an increase in dot surface coverage. For each ink, we fit according to Clapper-Yule (eq. 4) the unknown physical coverages of the measured single ink patches at nominal coverages of e.g. 10%, 20%, ..., 100% by minimizing the sum of square differences between measured spectra and predicted spectra. For the basic Clapper-Yule model, fitted single wedge cyan, magenta and yellow surface coverages are lower than the nominal surface coverages, i.e. we obtain a negative dot gain. This is due to the fact that spectra predicted by the Clapper Yule model are darker than the corresponding measured spectra. The fitted negative dot gain tends to bring both spectra to the same levels, i.e. the predicted (FIG. 2, continuous) and measured (FIG. 2, dashed) spectra intersect each other.

A New Spectral Color Prediction Model

Spectra predicted by the Clapper-Yule model are too dark (FIG. 2, continuous line), because according to the measured modulation transfer function of paper (see S. Inoue, N. Tsumara, Y. Miyake, Measuring MTF of Paper by Sinusoidal Test Pattern Projection, Journal of Imaging Science and Technology, Vol. 41, No. 6, November/December 1997, 657-661), light does not travel significantly more than 1/10 of a millimeter within coated paper. With a screen frequency of 30 to 60 lines per centimeter (75 to 150 lines per inch), the probability that light having entered at a place having a certain ink color exits from a place of the same color is higher than the coverage of that ink color. Therefore, the basic assumption of the Clapper-Yule model, i.e. the probability of light exiting from a specific colorant being equal to that colorant coverage, is not or only partially fulfilled.

In order to set a base line for improvements, the accuracy of the basic Clapper-Yule model including physical single ink dot gain (prior art method of fitting the dot gain) is tested on sheets printed with offset at lineatures of 60 lines per inch (hereinafter: "lpi") and of 30 lpi. For each of these lineatures, a set of 729 patches is produced by generating all combinations of inks at nominal coverages 0%, 12.5%, 25%, 37.5%, 50%, 62.5%, 75%, 87.5% and 100%. Measured and predicted spectra are converted to CIE-LAB values and the resulting error is computed. For the Clapper-Yule model, at a lineature of 60 lpi, a mean error of $\Delta E=4.11$ is obtained, the maximal error is 12.45 and 358 values have a $\Delta E$ greater than 4. At a lineature of 30 lpi, a mean error of $\Delta E=4.76$ is obtained, the maximal error is 10.21 and 435 values have a $\Delta E$ greater than 4.

In order to enhance the basic Clapper-Yule model, we assume that a certain part b of the incident light through a given colorant is reflected back and exits from the same colorant. The part (1−b) of the incoming light behaves in the same way as in the basic Clapper-Yule model described above (Eq. 5). We also make the simplifying assumption that the part b of the incident light which is reflected onto the same colorant also exits from the same colorant after one or several reflections at the paper-air interface.

Taking again multiple reflections into account, and considering a single ink only, the attenuation of the part of the incoming light exiting from the same ink color (either no ink or ink with coverage a) at the first exit is $$(1-r_s) \cdot r_g \cdot (1-r_i) \cdot (1-a+a \cdot t^2)$$

at the $2^{nd}$ exit, the attenuation is $$(1-r_s) \cdot r_g \cdot (1-r_i) \cdot (r_g \cdot r_i) \cdot (1-a+a \cdot t^4)$$

at the $n^{th}$ exit the attenuation is $$(1-r_s) \cdot r_g \cdot (1-r_i) \cdot (r_g^{n-1} \cdot r_i^{n-1}) [(1-a)+a \cdot t^{2n}]$$

The sum of all light exits after an infinite number of reflections yields the spectrum $$R(\lambda) = (1-r_s) \cdot (1-r_i) \cdot \left( \frac{(1-a) \cdot r_g}{1-(r_i \cdot r_g)} + \frac{a \cdot r_g \cdot t^2}{1-(r_i \cdot r_g \cdot t^2)} \right) \quad (8)$$

While Eq. 5 (Clapper-Yule) is based on the assumption that light propagates within the substrate along a long distance, Eq. 8 is based on the assumption that light propagates along short and middle distances. Equation 8 reflects the application of the Saunderson correction accounting for multiple internal reflections at the interface between the substrate (e.g. paper) and the air (see J. L. Saunderson, Calculation of the color pigmented plastics, Journal of the Optical Society of America, Vol. 32, 1942, 727-736): the first term models the substrate (e.g. paper) without ink (internal reflectance $r_g$) and the second term the substrate (e.g. paper) printed with solid ink (internal reflectance $r_g \cdot t^2$).

The disclosed spectral prediction model (Eq. 9), valid for any set of 3 inks and their 8 colorants (including the "transparent colorant" white) comprises a part b of light propagated along short and middle distances (Eq. 8) and a part (1–b) of the light propagated along long distances, compared with the period of a screen element (Eq. 5).

$$R(\lambda) = K \cdot r_s + (1-r_s) \cdot r_g \cdot (1-r_i) \cdot \quad (9)$$

$$\left[ b \cdot \sum_{j=1}^{8} \frac{a_j \cdot t_j^2}{1-r_i \cdot r_g \cdot t_j^2} + (1-b) \cdot \frac{\left( \sum_{j=1}^{8} a_j \cdot t_j \right)^2}{1-r_g \cdot r_i \cdot \sum_{j=1}^{8} a_j \cdot t_j^2} \right]$$

In order to obtain factor b for a given lineature, we establish the prediction accuracy for 729 patches and assign the value for b which yields the smallest mean error between the predicted and measured reflection spectra. For standard offset printing, i.e. screens mutually rotated by 30° and a screen frequency of 150 lines (screen elements) per inch, the fraction b of the light exiting from the same color as the incoming light yielding the smallest mean error for all considered test patches is b=0.1. Under the same conditions, at 75 lines per inch, we obtain a smallest error at b=0.6. However, factor b may take other values and still produce relatively good prediction results.

Equation 9 reflects the fact that the disclosed spectral prediction model comprises two components: one component weighted by factor b predicting reflection spectra by assuming that the light exits from the same colorant as the colorant from which it enters and one component weighted by factor (1–b) predicting reflection spectra by assuming that light components may exit from any component, with, in a preferred embodiment, a probability to exit from a given colorant proportional to that colorant's surface.

In printing equipment, there is often a trapping effect, i.e. when several inks are printed one on top of another, the ink layers may have a reduced thickness (see H. Kipphan, Handbook of Print Media, Springer-Verlag, 2001, pp. 103-105 and A. Stanton, G Raencic, Ink Trapping and Colorimetric Variation, Proc. TAGA 2001, 258-281). Our model takes care of trapping by computing the internal transmittances $t_{ij}$ of colorants obtained by the superposition of two inks (e.g. red, green, blue) and of three inks $t_{ijk}$ (e.g. black formed by cmy) according to equation 7. From the transmittance spectra $t_{ij}$ of two ink colorants (e.g. red, green, blue) and $t_{ijk}$ of three inks colorant (e.g. black), it deduces the relative thicknesses $d_i$ and $d_j$ of each ink of a pair of superposed inks or respectively the relative thicknesses $d_i$, $d_j$, $d_k$ of each ink of a triplet of superposed inks, (e.g. respectively thicknesses of magenta and yellow for red, cyan and yellow for green, cyan and magenta for blue, and cyan, magenta and yellow inks) according to Lambert-Bouguer-Beer's law $$t_{ij} = t_i^{d_i} \cdot t_j^{d_j} \text{ for two superposed inks} \quad (10a)$$

$$t_{ijk} = t_i^{d_i} \cdot t_j^{d_j} \cdot t_k^{d_k}; \text{ for three superposed inks} \quad (10b)$$

Relative thickness coefficients $d_i$ and $d_j$, respectively $d_i$, $d_j$, $d_k$, are fitted by minimizing the sum of square differences between spectra $t_{ij}$ (respectively $t_{ijk}$) and the spectrum obtained according to the right part of equation 10a, respectively 10b. The transmittances of ink superpositions $t_j$ of two or more inks in equation 9 may then be replaced by the corresponding expressions in the right part of equations 10a and 10b. These expressions describe the transmittance of superposed solid inks as multiplications of the transmittances of their contributing individual inks, said transmittances being raised to the power of their relative thicknesses. Replacing transmission spectra of superposed inks by the multiplication of transmission spectra of individual inks raised to the power of their relative thicknesses is only useful for fitting ink thicknesses at printing time. It does not add an additional degree of freedom into the disclosed spectral prediction model. Although less stable for fitting purposes, equations 10a and 10b may be extended to 4 inks as follows $$t_{ij} = t_i^{d_i} \cdot t_j^{d_j} \cdot t_k^{d_k} \cdot t_l^{d_l} \text{ for four superposed inks} \quad (10c)$$

Equations 10a 10b and to some extent equation 10c may also be useful for recovering from a transmission spectrum of the superposition of several inks the thickness(es) of one or respectively two out of several inks, assuming that the thicknesses of the remaining inks do not change.

In prior art prediction systems, dot surface coverages are generally modelled as if the dot surface coverage of an ink would be independent, whether that ink is printed alone or in superposition with other inks. However, printing one ink in superposition with (on top or below) a second solid ink may modify its surface coverage. Similarly, printing with one ink superposed with two other solid inks may also modify its surface coverage. However, until now, no color prediction system exists which takes into account combined ink surface coverages, i.e. coverages which are different when a halftone is printed alone or in superposition with one or two other solid inks or halftone ink layers.

We therefore introduce surface coverage functions mapping nominal dot surface coverages into effective (physical)

dot surfaces. These functions are hereinafter called "coverage mapping functions" or simply "mappings". In a preferred embodiment, we separately model as functions of nominal coverages (a) the surface coverages of single ink halftones (b) the surface coverages of single ink halftones superposed with one solid ink and (c) the surface coverages of single ink halftones superposed with two solid inks. We then appropriately weight these different surface coverage functions and obtain the resulting effective coverage of each ink as a function of the nominal ink surface coverages. During calibration of the model, effective coverage values defining the different surface coverage functions are fitted by minimizing the sum of square differences between measured and predicted reflection spectra. In the case of three inks (e.g. cyan, magenta and yellow), the calibration set can be as small as 44 samples. It comprises the paper white, seven solid ink samples and 36 halftone samples yielding 36 fitted surface coverages for the 12 linearly interpolating surface coverage functions described above. Other embodiments are also feasible, e.g. the creation of coverage mapping functions, where the second (or third) ink layer is not a solid ink layer but a halftone ink layer.

The functions describing surface coverages of single ink halftones printed on white paper are obtained by fitting effective surface coverages (e.g. at 25%, 50% and 75% nominal coverages) of an ink using the spectral prediction model given by equation 9. This allows to associate effective (fitted) surface coverages to the nominal surface coverages, for a limited set of halftone patches of each ink. By linear interpolation between the so obtained effective coverages, one obtains for each ink the coverage mapping function.

Similarly, the functions describing surface coverages of single ink halftones printed in superposition with (on top of or below) a second ink are obtained by fitting effective surface coverages (e.g. at 25%, 50% and 75% nominal coverages) of inks in superposition with a solid second ink using the spectral prediction model given by equation 9. This allows to associate effective (fitted) surface coverages to nominal coverages. By linear interpolation between the so obtained effective coverages, one obtains for each ink superposed with a second solid ink the coverage mapping function. A similar procedure is applied for computing coverage mapping functions, in the case of one ink superposed with two solid inks.

Let us consider as an example 3 inks $i_1$, $i_2$ and $i_3$ with coverages $c_1$, $c_2$ and $c_3$. The functions mapping nominal coverages to effective coverages for single ink halftones are $f_1(c_1), f_2(c_2)$ and $f_3(c_3)$. The functions mapping nominal coverages of an ink to effective coverages of that ink, for single ink halftones superposed with a second solid ink or single ink halftones superposed with two solid inks are:

for ink $i_1$ of coverage $c_1$ superposed with solid ink $i_2$: $f_{21}(c_1)$,
for ink $i_1$ of coverage $c_1$ superposed with solid ink $i_3$: $f_{31}(c_1)$,
for ink $i_2$ of coverage $c_2$ superposed with solid ink $i_1$: $f_{12}(c_2)$,
for ink $i_2$ of coverage $c_2$ superposed with solid ink $i_3$: $f_{32}(c_2)$,
for ink $i_3$ of coverage $c_3$ superposed with solid ink $i_1$: $f_{13}(c_3)$,
for ink $i_3$ of coverage $c_3$ superposed with solid ink $i_2$: $f_{23}(c_3)$,
for ink $i_1$ of coverage $c_1$ superposed with solid inks $i_2$ and $i_3$: $f_{231}(c_1)$,
for ink $i_2$ of coverage $c_2$ superposed with solid inks $i_1$ and $i_3$: $f_{132}(c_2)$,
for ink $i_3$ of coverage $c_3$ superposed with solid inks $i_1$ and $i_2$: $f_{123}(c_3)$.

In the present case, these 12 functions may be obtained by fitting 36 patches, i.e. 3 patches (25%, 50% and 75% coverages) per function.

Figure 3:
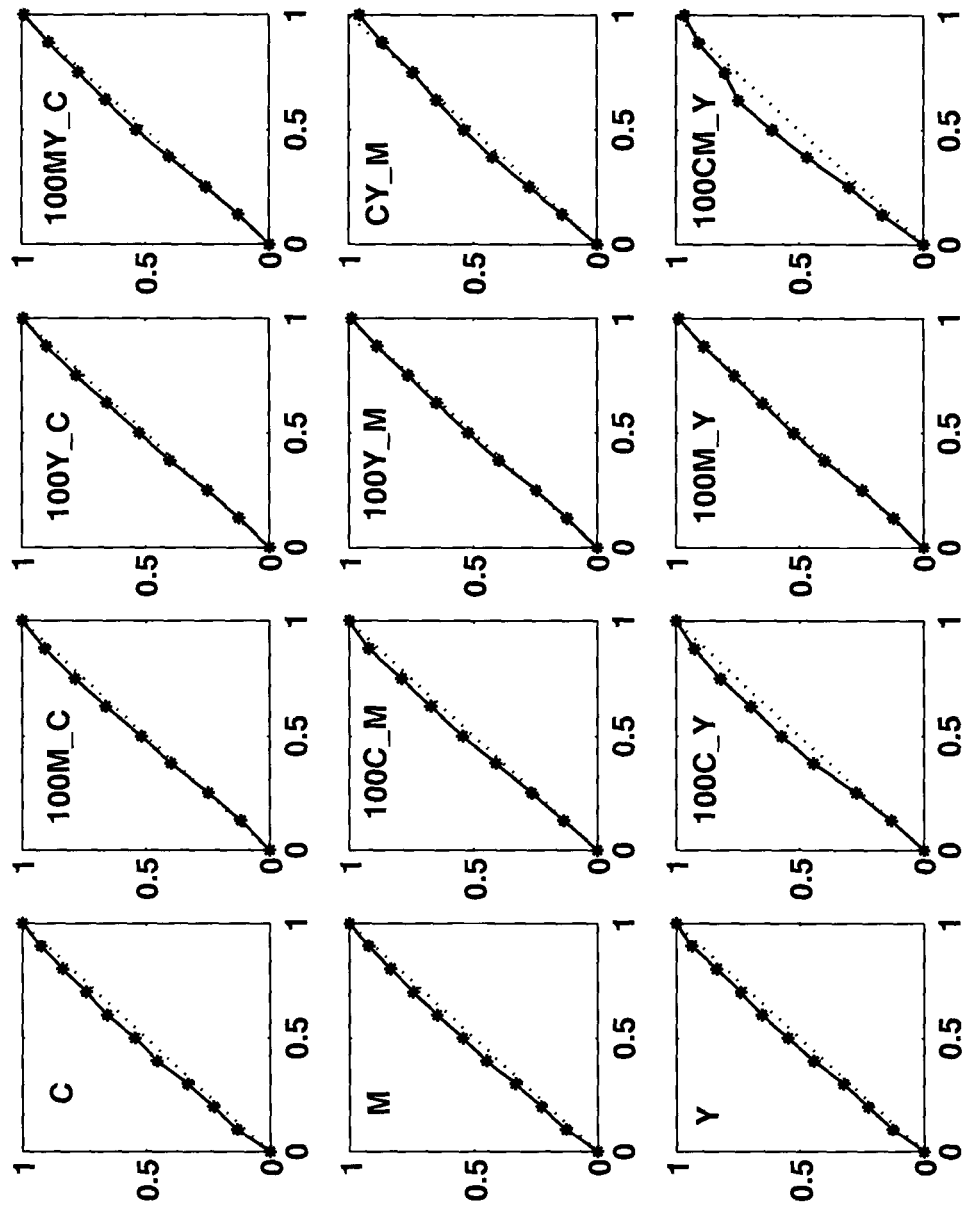
FIG. 3. shows an example of effective surface coverages as functions of nominal surface coverages for single ink halftone wedges (left column), wedges superposed with one solid ink (2nd and 3rd column), and for wedges superposed with two solid inks (right column) fitted according to the comprehensive spectral prediction model.

FIG. 3 gives an example of effective surface coverages (round black dots at nominal coverages of 10%, 20%, . . . , 90%) fitted according to the disclosed spectral prediction model, for wedges printed alone (left column), for wedges printed in superposition with one solid ink (2nd and 3rd columns) and for wedges printed in superposition with two solid inks (right column). Wedges of cyan are shown in the first row, wedges of magenta in the second row and wedges of yellow in the third row. One can see for example that the surface coverages of magenta (second row) depend if magenta is printed alone (2nd row, 1st column), in superposition with cyan (2nd row, 2nd column), in superposition with yellow (2nd row, 3rd column) or in superposition with cyan and magenta (2nd row, 4th column). One can observe the same phenomenon for yellow wedges (3rd row).

Once surface coverages are fitted according to the disclosed prediction model, interpolating (e.g. linearly) between these surface coverages (in FIG. 3, dark line segments connecting the round black dots) yields the functions mapping nominal to effective (i.e. physical) surface coverages for wedges printed in different superposition conditions.

For a nominal halftone patch of coverages $c_1$, $c_2$ and $C_3$, it is necessary for each ink $i_k$, to weight the contributions of the corresponding mapping functions $f_k$, $f_{ik}$, $f_{mk}$, and $f_{lmk}$. The weighting functions depend on the effective coverages of the considered ink alone, of the considered ink in superposition with a second ink and of the considered ink in superposition with the two other inks. For the considered system of 3 inks $i_1$, $i_2$ and $i_3$ with nominal coverages $c_1$, $c_2$ and $c_3$ and effective coverages $c_1'$, $c_2'$ and $c_3'$, assuming that inks are printed independently of each other, and by computing the relative weight, i.e. the relative surface of each superposition condition we obtain the system of equations (11). For example, the proportion (relative effective surface) of a halftone patch printed with ink $i_1$ at a coverage $c_1$ on the substrate (paper) is $(1-c_2')(1-c_3')$. The proportion of the same patch printed on top of solid ink $i_2$ is $c_2'(1-c_3')$, the proportion of the same patch printed on top of solid ink $i_3$ is $(1-c_2')c_3'$ and the proportion of the same patch printed on top of solid inks $i_2$ and $i_3$ is $c_2'c_3'$. We obtain the following system of equations:

$$c_1' = f_1(c_1)(1-c_2')(1-c_3') + f_{21}(c_1)c_2'(1-c_3') + f_{31}(c_1)(1-c_2')c_3' + f_{231}(c_1)c_2'c_3'$$

$$c_2' = f_2(c_2)(1-c_1')(1-c_3') + f_{12}(c_2)c_1'(1-c_3') + f_{32}(c_2)(1-c_1')c_3' + f_{132}(c_2)c_1'c_3'$$

$$c_3' = f_3(c_3)(1-c_1')(1-c_2') + f_{13}(c_3)c_1'(1-c_2') + f_{23}(c_3)(1-c_1')c_2' + f_{123}(c_3)c_1'c_2' \quad (11)$$

This system of equations can be solved iteratively: one starts by setting initial values of $c_1'$, $c_2'$ and $c_3'$ equal to the respective nominal coverages $c_1$, $c_2$ and $c_3$. After one iteration, one obtains new values for $c_1'$, $c_2'$ and $c_3'$. These new values are used for the next iteration. After a few iterations, typically 4 or 5 iterations, the system stabilizes and the obtained coverages $c_1'$, $c_2'$ and $c_3'$ are the effective coverages. The system of equations (eq. 11) allows therefore to compute ink surface coverages (physical coverages) resulting from the combination of ink surface coverages (physical dot gains) under varying superposition conditions. These ink surface coverages are called "combined ink surface coverages" or "combined ink coverages".

Figure 4:
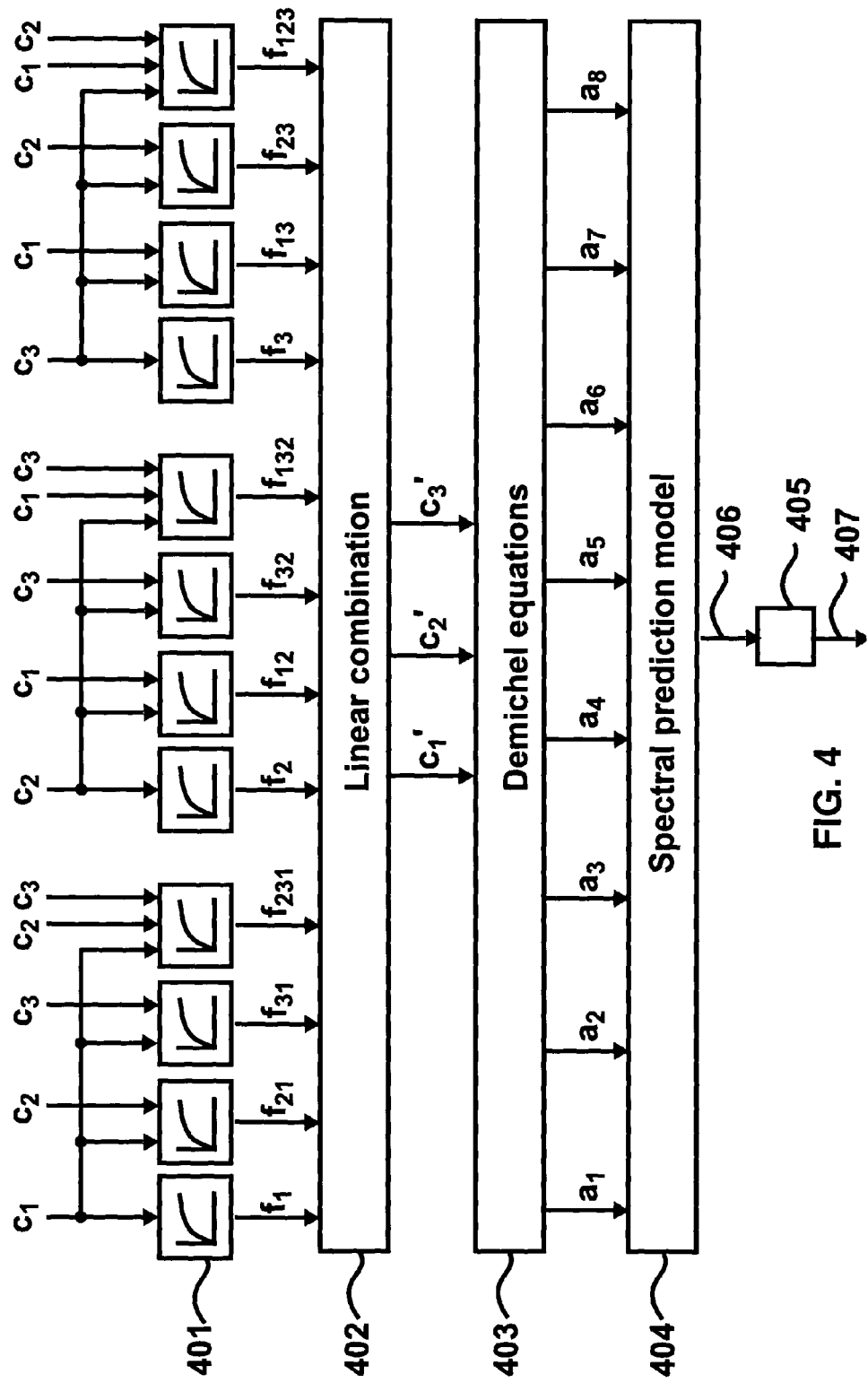
FIG. 4. shows a diagram of the disclosed comprehensive spectral prediction model incorporating also the mapping between nominal to effective surface coverages under different superposition conditions.

The effective colorant coverages are obtained from the effective coverages $c_1'$, $c_2'$ and $c_3'$ of the inks according to the Demichel equations (eq. 2), see also FIG. 4, 403. With the disclosed spectral prediction model 404 and by taking into account the disclosed combined ink coverages (physical dot sizes), for the same printed offset pages as before, at 60 lpi, a mean error between predicted reflection spectra 406 and measured reflection spectra (in the present case 729 spectra) of $\Delta E=1.62$ was obtained, the maximal error is $\Delta E=3.94$ and no value has a $\Delta E$ greater than 4. At 30 lpi, a mean error between predicted reflection spectra and measured reflection spectra (in the present case 729 spectra) of $\Delta E=1.54$ was obtained, the maximal error is $\Delta E=4.34$ and 5 values have a $\Delta E$ greater than 4. This model is very stable and well adapted to the underlying physical phenomena, since its only free parameters, for a given lineature, are the surface coverages. All its internal transmission and reflection spectra are calculated (rather than fitted as in E. J. Stollnitz, V. Ostromoukhov, D. Salesin, Reproducing Color Images Using Custom Inks, Proc. of SIGGRAPH 98, in Computer Graphics Proceedings, Annual Conference Series, 1998, 267-274). In the disclosed comprehensive spectral prediction model, ink thickness parameters are deduced by a fitting procedure from calculated transmission spectra and do therefore not represent additional free parameters.

With the same logic of taking into consideration the effective colorant coverages, one may extend equations (eq. 2), (eq. 9), and (eq. 11) in order to also predict the reflection spectra of patches printed with more than 3 transparent inks, for example 4 custom transparent inks or the standard inks cyan, magenta, yellow and black.

The extension of equation 2 to four inks $i_1$ $i_2$, $i_3$, $i_4$, with respective coverages $c_1$, $c_2$, $c_3$, $c_4$ yields the colorant coverages $i_1$ alone: $a_1 = c_1 \cdot (1-c_2) \cdot (1-c_3) \cdot (1-c_4)$ $i_2$ alone: $a_2 = (1-c_1) \cdot c_2 \cdot (1-c_3) \cdot (1-c_4)$ $i_3$ alone $a_3 = (1-c_1) \cdot (1-c_2) \cdot c_3 \cdot (1-c_4)$ $i_4$ alone: $a_4 = (1-c_1) \cdot (1-c_2) \cdot (1-c_3) \cdot c_4$ $i_1$ and $i_2$: $a_5 = c_1 \cdot c_2 \cdot (1-c_3) \cdot (1-c_4)$ $i_1$ and $i_3$: $a_6 = c_1 \cdot (1-c_2) \cdot c_3 \cdot (1-c_4)$ $i_1$ and $i_4$: $a_7 = c_1 \cdot (1-c_2) \cdot (1-c_3) \cdot c_4$ $i_2$ and $i_3$: $a_8 = (1-c_1) \cdot c_2 \cdot c_3 \cdot (1-c_4)$ $i_2$ and $i_4$: $a_9 = (1-c_1) \cdot c_2 \cdot (1-c_3) \cdot c_4$ $i_3$ and $i_4$: $a_{10} = (1-c_1) \cdot (1-c_2) \cdot c_3 \cdot c_4$ $i_1$, $i_2$ and $i_3$: $a_{11} = c_1 \cdot c_2 \cdot c_3 \cdot (1-c_4)$ $i_2$, $i_3$ and $i_4$: $a_{12} = (1-c_1) \cdot c_2 \cdot c_3 \cdot c_4$ $i_1$, $i_3$ and $i_4$: $a_{13} = c_1 \cdot (1-c_2) \cdot c_3 \cdot c_4$ $i_1$, $i_2$ and $i_4$: $a_{14} = c_1 \cdot c_2 \cdot (1-c_3) c_4$ $i_1$, $i_2$, $i_3$ and $i_4$: $a_{15} = c_1 \cdot c_2 \cdot c_3 \cdot c_4$ white: $a_{16} = (1-c_1) \cdot (1-c_2) \cdot (1-c_3) \cdot (1-c_4)$ (12)

Similar systems of equations can be established for 5, 6 or more inks.

The extension of equation 9 to four inks leads to $$R(\lambda) = K \cdot r_s + (1-r_s) \cdot r_g \cdot (1-r_i) \cdot \qquad (13)$$

$$\left[ b \cdot \sum_{j=1}^{16} \frac{a_j \cdot t_j^2}{1 - r_i \cdot r_g \cdot t_j^2} + (1-b) \cdot \frac{\left( \sum_{j=1}^{16} a_j \cdot t_j \right)^2}{1 - r_g \cdot r_i \cdot \sum_{j=1}^{16} a_j \cdot t_j^2} \right]$$

Similar equations can be established for 5, 6 or more inks. The extension of equation 11 to four inks leads to $$c_1' = f_1(c_1)(1-c_2')(1-c_3')(1-c_4') + \qquad (14)$$
$$f_{21}(c_1)c_2'(1-c_3')(1-c_4') + f_{31}(c_1)(1-c_2')c_3'(1-c_4') +$$
$$f_{231}(c_1)c_2'c_3'(1-c_4') + f_{4231}(c_1)c_2'c_3'c_4'$$

$$c_2' = f_2(c_2)(1-c_1')(1-c_3')(1-c_4') +$$
$$f_{12}(c_2)c_1'(1-c_3')(1-c_4') + f_{32}(c_2)(1-c_1')c_3'(1-c_4') +$$
$$f_{132}(c_2)c_1'c_3'(1-c_4') + f_{1342}(c_2)c_1'c_3'c_4'$$

$$c_3' = f_3(c_3)(1-c_1')(1-c_2')(1-c_4') +$$
$$f_{13}(c_3)c_1'(1-c_2')(1-c_4') + f_{23}(c_3)(1-c_1')c_2'(1-c_4') +$$
$$f_{123}(c_3)c_1'c_2'(1-c_4') + f_{1243}(c_3)c_1'c_2'c_4'$$

$$c_4' = f_4(c_4)(1-c_1')(1-c_2')(1-c_3') +$$
$$f_{14}(c_4)c_1'(1-c_2')(1-c_3') + f_{24}(c_4)(1-c_1')c_2'(1-c_3') +$$
$$f_{124}(c_4)c_1'c_2'(1-c_3') + f_{1234}(c_4)c_1'c_2'c_3$$

A similar system of equations can be established for 5, 6 or more inks.

The spectral prediction model, together with the functions mapping nominal to effective ink surface coverages (called "comprehensive spectral prediction model") allows a very accurate prediction of the reflection spectrum. With the well-known formula for converting reflection spectra to colorimetric values (e.g. CIE-XYZ), see H. R. Kang, "Color Technology for Electronic Imaging Devices", SPIE Optical Engineering Press, 1997, pp. 8-12, colorimetric values of printed halftone patches (FIG. 4, 407) are also predicted with a high accuracy.

Steps for Calibrating the Comprehensive Model

In a preferred embodiment, assuming that one uses inks $i_1$, $i_2$, and $i_3$ for the reproduction of images, calibrating the disclosed comprehensive prediction model for printing with standard inks comprises the following steps. As an example, we mention in parentheses the inks cyan for $i_1$, magenta for $i_2$, and yellow for $i_3$.

(1) Separately printing single ink solid patches is (cyan), $i_2$ (magenta), $i_3$ (yellow), and multiink solid patches $i_{23}$ i.e. superposition of $i_2$, $i_3$ (red), $i_{13}$ i.e. superposition of $i_1$, $i_3$ (green), $i_{12}$ i.e. superposition of $i_1$, $i_2$ (blue) and $i_{123}$ i.e. superposition of $i_1$, $i_2$, $i_3$ (black made of a superposition of solid cmy).

(2) Separately printing $i_1$, $i_2$, $i_3$ (e.g. cyan, magenta and yellow) halftone patches (hereinafter called wedges), for example at 25%, 50% and 75% ink coverages.

(3) Printing ink wedges in superposition with the other solid inks in order to account for combined ink coverages, i.e. an is wedge (cyan) printed in superposition with solid $i_2$ (magenta), an is wedge (cyan) printed in superposition with solid $i_3$ (yellow), an is wedge (cyan) printed in superposition with solid $i_2$ (magenta) and solid $i_3$ (yellow), an $i_2$ wedge (magenta) printed in superposition with solid $i_1$ (cyan), an $i_2$ wedge (magenta) printed in superposition with solid $i_3$ (yellow), an $i_2$ wedge (magenta) printed in superposition with solid $i_1$ (cyan) and solid $i_3$ (yellow), an $i_3$ wedge (yellow) printed in superposition with solid is (cyan), an $i_3$ wedge (yellow) printed in superposition with solid $i_2$ (magenta), an $i_3$ wedge (yellow) printed in superposition with solid is (cyan) and solid $i_2$ (magenta). The order in which the inks are printed is free (e.g. first cyan, then magenta, and then yellow) but cannot be changed while calibrating the model and while using the calibrated model for performing predictions or parameter fitting operations.

(4) Computing the internal reflectance of paper $r_g$ thanks to equation 6 and the internal transmittances of the inks and their superpositions thanks to equation 7.

(5) Fitting according to equation 9, or in the case of 4 inks, according to equation 13 effective surface coverage values of the single ink wedges printed at representative nominal surface coverages such as 25%, 50% and 75%, of ink wedges superposed with one other solid ink, of ink wedges superposed with two other solid inks and in the case of four inks, wedges of one solid ink superposed with three other solid inks. The fitted effective surface coverages allow to define the functions mapping nominal to effective surface coverages. These functions are made continuous by linearly interpolating between their respective fitted effective surface coverages. In the case of three inks, functions $f_1(c_1)$, $f_2(c_2)$, $f_3(c_3)$ represent the mapping between nominal to effective surface coverages for the wedges printed in step (2) and the functions $f_{21}(c_1)$, $f_{31}(c_1)$, $f_{231}(c_1)$, $f_{12}(c_2)$, $f_{32}(C_2)$, $f_{132}(c_2)$, $f_{13}(c_3)$, $f_{23}(c_3)$, $f_{123}(c_3)$ represent the mapping between nominal to effective surface coverages for the wedges printed in step (3). Similar functions are obtained when printing with more than 3 inks (e.g. 4 inks when printing with cyan, magenta, yellow, black, or with 6 inks, when printing with cyan, magenta, yellow, black, light cyan, and light magenta inks).

The comprehensive spectral prediction model may be embodied within a module called "comprehensive spectral prediction module". Such a module may for example be realized as a software object (e.g. a C++ class).

Steps for Building 3D Device Calibration Tables

Printing with standard or non-standard inks generally requires a transformation of color coordinates from device-independent space (e.g. CIE-XYZ) to nominal ink coverages. Input images to be reproduced are generally given as displayable RGB values with a known transformation to CIE-XYZ (see section 5.8, CRT Displays, Digital Color Imaging Handbook, Ed. G. Sharma, CRC Press, 324-328). RGB values are therefore easily transformed to device independent calorimetric values (e.g. CIE-XYZ). Generally, printing systems, printer driver software and calibration software packages incorporate a device calibration 3D lookup table used for the mapping between device-independent colorimetric values and ink surface coverages. Thanks to the disclosed comprehensive spectral prediction model, we disclose a new method for populating such device calibration lookup tables, which requires a smaller set of measured samples and offers a more precise calibration compared with prior art methods (see section "Background of the invention").

Since the disclosed comprehensive spectral prediction model allows to compute the reflection spectrum (FIG. 4, 406) of patches incorporating freely chosen coverages of a given set of inks, it also allows to predict their colorimetric value (CIE-XYZ), see H. R. Kang, "Color Technology for Electronic Imaging Devices", SPIE Optical Engineering Press, 1997, pp. 8-12. This allows to establish equation 15 derived from equation 9 or respectively from equation 13 having the form $$X=f_X(R)$$

$$Y=f_Y(R)$$

$$Z=f_Z(R) \quad (15)$$

where $f_X$, $f_Y$, $f_Z$ are the formula (FIG. 4, 405) allowing to compute X,Y and Z values (FIG. 4, 407) from a reflection spectrum 406 and where R is the reflection spectrum given by equation 9 in the case of three inks and equation 13 in the case of four inks. If one would like to compute nominal ink coverages from given X,Y, and Z colorimetric values, this can be carried out by fitting the nominal ink coverages which minimize the sum of square differences between desired and predicted X,Y and Z values, according to the comprehensive prediction model. In such a case, the nominal ink coverages are fitted with the fitting objective of reaching the desired X,Y,Z values.

After having calibrated the comprehensive prediction model, one may build a 3D device calibration table allowing to map device-independent calorimetric values (e.g. CIE-XYZ) to nominal coverages of the inks comprises the following steps:

(a) create in a color space, preferably in a device-independent colorimetric space (e.g. CIE-XYZ) a device calibration 3D lookup table (e.g. a 3D rectilinear grid);

(b) for each entry within the lookup table (e.g. point with given colorimetric tri-stimulus value within the rectilinear grid), try to fit corresponding nominal ink coverages so as to minimize the sum of square differences between desired and predicted device-independent colorimetric tri-stimulus values (e.g. CIE-XYZ or CIE-LAB).

Only nominal ink coverages between 0 and 100% represent physically realizable solutions. Negative coverages and solutions with an ink coverage larger than 100% must be discarded. If the fitting procedure yields no realizable solution, i.e. no solution reaching the fitting objective, then there is no possibility of printing the corresponding calorimetric tri-stimulus value with the selected set of inks. In the general case, with three inks, there will either be one solution or no solution. With four inks, the system is underdetermined and an additional constraint needs to be introduced. With more than three inks, it is also possible to render colors by selecting for each target color a subset of three inks from the set of available inks (see section below, "Device calibration for printing with freely chosen inks").

Since, for a given device, e.g. a display, a triplet of color coordinates such as RGB coordinates may be easily converted into device independent colorimetric tri-stimulus values (e.g. CIEXYZ), it is also possible to have as device calibration table entries triplets of color coordinates.

Device Calibration with Undercolor Removal

Let us consider the well-known undercolor removal problem when printing with cyan, magenta, yellow and black inks. Thanks to the disclosed comprehensive spectral prediction model, one may, for carrying out undercolor removal (in short form: UCR), first fit the nominal coverages of cyan, magenta, and yellow (c,m,y) alone to the desired device independent colorimetric tri-stimulus value (e.g. CIE-XYZ). According to a rule hereinafter called "maximal black" one may compute the minimum of the (c,m,y) coverages and set the coverage of black (k) to a value proportional to that minimum, e.g. 80% of that minimum. The amount of k is fixed, and the other coverages $C_k$, $M_k$ and $Y_k$ are then fitted with the comprehensive spectral prediction model to yield the coverages ($C_k$, $m_k$, $Y_k$, k) reproducing the given calorimetric values (e.g. CIE-XYZ). One may (according to C. Nakamura and K. Sayanagi, Gray Component Replacement by the Neugebauer Equations, Proc. Neugebauer Memorial Seminar on Color Reproduction, SPIE Vol. 1184, 1989, pp. 50-63) also decide to have "maximal black" only at dark tones ($Y' < Y'_{min}$) and to have at other tones relative proportion of black corresponding to the maximal black multiplied by an attenuation factor $f_{att}$ $$f_{att} = \frac{(1-Y')^n}{1 - Y'_{min}} \text{ for } Y' > Y'_{min} \tag{13}$$

where Y' is the Y value of a colorimetric X,Y, Z triplet divided by 100, i.e. in the range between 0 and 1, where $Y'_{min}$ is a low value for Y', for example $Y'_{min} = 0.2$ and where n specifies the steepness of the maximal black attenuation factor, generally chosen between 2 to 5.

Such an undercolor removal system relying on the disclosed comprehensive spectral prediction model allows to obtain more precise colorimetric values than prior art systems which either rely on densities for undercolor removal (J. A. C Yule, Principles of Color Reproduction, J. Wiley, 1967, Chapter 11, Four-Color Printing and the Black Printer, pp. 282-303) or fit the value of $C_k$, $m_k$, $Y_k$ according to the rather imprecise Neugebauer colorimetric model (see C. Nakamura and K. Sayanagi, cited above). Other state of the art undercolor removal methods are cumbersome, since they rely on color measurements (CIE-XYZ, CIE-LAB, or CIE-LUV) of a large set of printed patches which represent combinations of ink coverages obtained by varying nominal coverage values (e.g. 0%, 10%, 20%, . . . 100% coverage) of each contributing ink (cyan, magenta, yellow and black) and which adopt a specific strategy to replace cyan, magenta, yellow values by corresponding cyan, magenta, yellow and black (see U.S. Pat. No. 5,402,253, to Seki, for Color Conversion Method and Apparatus with a Variable Gray Component Replacement Ratio, granted Mar. 28, 1995, U.S. Pat. No. 5,502,579 to Kita, et. al., for Color Image Processing Method and Apparatus Capable of Adjusting the UCR Ratio, granted Mar. 26, 1996, U.S. Pat. No. 5,508,827, to H. Po-Chieh, for Color Separation Processing Method and Apparatus for a Four Color Printer, granted Sep. 3, 1996.

Values of $C_k$, $m_k$, $Y_k$ that are fitted according to the disclosed comprehensive prediction model allow to populate a device calibration 3D lookup table whose entries represent a rectilinear grid in device-independent color space by values associating device-independent tri-stimulus values (e.g. CIE-XYZ) with nominal ink coverages of cyan, magenta, yellow and black inks ($C_k$, $m_k$, $Y_k$, k). Once populated thanks to the comprehensive prediction model, the device calibration lookup table provides a means of carrying out the color separation from device-independent space to the cyan, magenta, yellow and black output space and distinguishes itself from prior art approaches by avoiding any color shift due to undercolor removal.

Device Calibration for Printing with Freely Chosen Inks

In the general case of a four or more freely chosen inks (standard or non-standard inks, such as Pantone inks), one may decide to reproduce a given colorimetric value (e.g. CIE-XYZ) by selecting a subset of 3 inks from the set of available inks. One may, for each subset of 3 inks, try to fit the nominal coverages of its inks so as to obtain the desired colorimetric tri-stimulus value. In the case that none of the inks subsets yields a solution, the desired color is not reproducible. In the case that exactly one ink subset yields a solution, the fitted nominal coverages are used to reproduce the desired colorimetric value. In the case that two or more different ink subsets yield a solution, one may choose the subset verifying certain properties or the subset which maximizes a specific quality measure. For example, one may prefer solutions where the black ink is always present. Or one may prefer a subset of inks where the mean of the relative lightness differences (L value of CIE-LAB) between pairs of solid inks making up the subset is minimized (for example for the smooth rendition of the skin). Further examples of criteria are listed in the publication incorporated here by reference, by S. Chosson, R. D. Hersch, "Visually-based color space tetrahedrizations for printing with custom inks", Proc. SPIE, Color Imaging: Device-Independent Color, Color Hardcopy, and Graphic Arts VI, January 2001, San Jose, SPIE Vol. 4300, 81-92. Fitting coverages of subsets of inks and in case of multiple solutions, selecting the subset optimizing image quality allows to populate the device calibration lookup table (rectilinear grid in device-independent color space) by values associating device-independent tri-stimulus values with nominal ink coverages of the selected inks. Once populated thanks to the comprehensive prediction model, the device calibration lookup table provides a means of carrying out the color separation from device-independent calorimetric tristimulus values to the set of available inks which may comprise non-standard inks as well as standard inks. This new color separation method for creating color separations with non-standard (custom) inks distinguishes itself from prior art approaches such as U.S. Pat. No. 5,734,800 (Six-color process system, inventors R. Hebert and A. DiBernardo, issued Mar. 31, 1998) by requiring to measure only a limited set of patches and by relying on a comprehensive spectral prediction model. It differs from the approach proposed by Stollnitz et. al. (see E. J. Stollnitz, V. Ostromoukhov, D. Salesin, "Reproducing Color Images Using Custom Inks", Proc. of SIGGRAPH 98, in Computer Graphics Proceedings, Annual Conference Series, 1998, 267-274) by computing rather than fitting internal transmission and reflection spectra, yielding more stable results. It further distinguishes itself from the approach disclosed in U.S. Pat. No. 5,936,749 (Method and apparatus for preparing special color separation, issued Aug. 10, 1999, inventor I. Ikeda) by not relying on densities, but rather on reflection spectra which yield a much higher precision.

Device Calibration for Printing with Light Cyan and Light Magenta

Recent printers incorporate the possibility of printing with cyan (C), magenta (M), yellow (Y), black (K) and with the two additional inks light cyan (c) and light magenta (m). A first prior-art model based color separation for CMYKcm inks, relying on the Yule-Nielsen model, is described in A. U. Agar, Model Based Separation for CMYKcm Printing, Proceedings of The Ninth IS&T/SID Color Imaging Conference, Scottsdale, Ariz., 2001, pp. 298-302. However, due to the higher accuracy of the comprehensive spectral prediction model disclosed in the present invention, the color separation for populating a device calibration 3D lookup table can be simplified by first carrying out a color separation from RGB to standard cyan, magenta yellow coverages (CMY), and then, thanks to the comprehensive spectral prediction model, to replace cyan, magenta, and black (CMY) coverages by C'M'Y'K'c'm' coverages yielding the same colors as the originally color separated CMY values. The replacement of a CMY coverage by a C'M'Y'K'c'm' coverage is carried out by performing the steps of (a) predicting according to the comprehensive spectral prediction model the reflectance of the CMY patch;
(b) fitting that reflectance by an intermediate $C_iM_iY_ic_im_i$ coverage, taking into account additional conssstraints such as:
 (i) those mentioned in section "Device calibration for printing with freely chosen inks", or
 (ii) maximizing the amount of light cyan and light magenta or
 (iii) considering a fraction of the maximal amount of fitted light cyan, respectively light magenta by introducing a reduction factor $f_r$ which is 0 at a certain relative luminance $Y_{low}$ (e.g. 0.3) and grows (e.g. in proportion) with Y until it reaches the value 1 at a relative luminance $Y_{high}$ (e.g. 0.8), and remains 1 for luminances higher than $Y_{high}$. The selected amount of light cyan $c_1$, respectively light magenta $m_i$ is the maximally fitted amount of light cyan, respectively light magenta multiplied by the reduction factor $f_r$. The remaining parameters $C_iM_iY_i$ are then fitted by applying the comprehensive spectral prediction model.
(c) carrying out undercolor removal on the $C_iM_iY_ic_im_i$ coverage, by adding the black (K) ink and reducing amounts of the $C_iM_iY_i$ inks e.g. as described in section "Device calibration with undercolor removal". This last step yields the resulting C'M'Y'K'c'm' coverages of inks.

An alternative for populating a device calibration 3D lookup table whose entries represent device-independent calorimetric tri-stimulus values comprises the following steps:

(a) computing intermediate coverages of $C_iM_iY_ic_im_i$ values by fitting these coverages according to the comprehensive spectral prediction model, by maximizing the amount of light cyan and light magenta with the fitting objective given by a device-independent colorimetric tristimulus value associated to an entry of the device calibration lookup table;
(b) possibly reducing the amounts of light cyan $c_1$ and light magenta $m_i$ according to the previously introduced reduction factor $f_r$; and
(c) carrying out undercolor removal on the $C_iM_iY_ic_im_i$ coverage as in the previous alternative.

This last step yields the resulting C'M'Y'K'c'm' coverages of inks.

Steps for Carrying Out the Color Separation

We assume that a device calibration 3D lookup table has been populated by applying the comprehensive spectral prediction model as described in the previous sections. To separate the input image into printable ink coverages, the following steps are carried out:
1. Traverse the input image pixel by pixel and row by row;
2. Obtain for each pixel (x,y) its device-independent colorimetric tri-stimulus value (e.g. CIE-XYZ)
3. Convert its colorimetric tri-stimulus value into coverages of inks by accessing and carrying out tri-linear interpolation within the device calibration 3D lookup table.

The input image is generally given in red, green, and blue display coordinates, which can be translated to CIE-XYZ calorimetric values, (see section 5.8, CRT Displays, Digital Color Imaging Handbook, Ed. G. Sharma, CRC Press, 324-328). The set of available inks is either the set of standard inks (c,m,y or c,m,y,k), a set of inks comprising standard and non-standard inks (custom inks), the set of CMYKcm inks or a set of freely chosen inks (custom inks).

Halftoning Techniques

The color separation method relying on a device calibration lookup table populated by applying the comprehensive prediction model is valid for any combination of selected inks. When printing with 3 dark inks, one may use the standard printing screen angles (e.g. 15°, 45°, 75°), and place a highlight ink such as yellow at 0°. Additional inks may be printed by using stochastic screens (see H. Kipphan, Handbook of Print Media, Springer-Verlag, 2001, p. 92). Alternately, all inks may use stochastic screens.

Control of Printing Presses and Printers

The disclosed comprehensive spectral prediction model incorporates physical print parameters such as the effective physical (also called mechanical) size of the surface coverage of printed dots, the internal transmission spectra of individual inks, their relative thicknesses, and the internal reflection spectrum of the substrate. It is one aim of the present invention to infer variations of print parameters (physical surface coverage, i.e. physical dot size, relative ink thickness) based on the measurement of either the reflection spectrum or the colorimetric values (e.g. CIE-XYZ) of color patches. From the variations of print parameters, it is possible to modify printer actuation parameters acting for example on the flow of ink or the pressure applied to the page being printed. Modifying the ink flow is important in order to ensure that pages which need much ink are printed under the same conditions as pages which need less ink. This is especially important in "print on demand" printers, where the page content may vary during the print run.

Prior art systems embed special solid or halftone patches in the borders of printed pages (e.g. U.S. Pat. No. 4,852,485, to F. Brunner, for Method of Operating an Autotypical Color Offset Printing Machine) in order to verify and correct printer actuation parameters such as those controlling the ink flow. To avoid the cost of embedding special patches within printable areas, which need to be cut out after printing, we disclose how to infer print parameters from constant polychromatic color halftone patches located within printed pages for example as background of graphic art images or as thick bars separating between different portions of a printed page.

Print parameters are obtained by comparing the parameters initially inferred from the comprehensive spectral prediction model during spectral prediction model calibration or when the print job is started and the parameters inferred from the comprehensive spectral prediction model during the execution of a print job (printing time). Differences in print parameters such as surface coverages or ink thicknesses can be computed and used to control the printer, i.e. to change printer actuation parameters within the printer which allow to modify printer output values such as the rate of ink flow, the printing speed, the pressure or the temperature.

The comprehensive spectral prediction model for a given print configuration (a given printer, a given paper, given inks, etc.) is first established by measuring at calibration time solid and halftone patches as described in section "Steps for building 3D device calibration tables". From this comprehensive spectral prediction model, important print parameters such as relative ink thicknesses when printing superpositions of two or more inks are deduced according to equations 10a, 10b and possibly 10c. At calibration time or when starting a print job, for constant color elements of given reflectance or respectively colorimetric (e.g. CIE-XYZ) values, effective physical surface coverages can be fitted by minimizing the sum of square differences between predicted reflectances and reflectances deduced from color element measurements, or respectively between predicted colorimetric values and colorimetric values deduced from color element measurements.

When running the print job, the same constant color elements embedded within the printed page are measured from time to time in order to obtain either their reflectance spectra or their calorimetric values. If the printer is known to maintain a constant pressure as well as other constant parameters (e.g. temperature) and needs mainly to vary the ink flow according to the printed page content, current values of ink thickness are fitted according to the comprehensive spectral prediction model. By comparing the fitted ink thicknesses deduced from reflection or calorimetric measurements at printing time with the initial ink thicknesses deduced from measurements made at calibration time or at the start of the print job (according to equations 10a and 10b), one derives a difference in ink thickness allowing to control the ink flow of the printer.

If the printer is known to transfer an amount of ink proportional to the surfaces which need to be inked (constant ink flow per printed surface element) and to vary another printer actuation parameter controlling for example the pressure between the ink transfer element and the substrate (paper), the distance between the ink transfer element and the substrate (paper) or the temperature, then the effective surface coverages can be fitted from the measurements by leaving the ink thicknesses constant and by applying the comprehensive spectral prediction model. Differences in effective surface coverages between initial effective coverages computed at calibration time or when the print job is started and coverages deduced at print time allow to control the corresponding printer actuation parameter.

In some printers (e.g. offset printing presses), experience shows that an increase in ink flow increases both the ink thickness and the surface coverage. In such a case, differences between fitted ink thickness at printing time and the ink thickness initially present (at calibration or job print start time) as well as differences between fitted effective surface coverage at printing time and the surface coverage initially present give values characterizing the modification of ink flow and may be used to control the ink flow in the printer.

Best results are obtained when deducing ink thicknesses with constant polychromatic color patches at surface coverages between 30% and 60%. Excellent results are obtained when deducing ink thicknesses with constant color halftone elements printed with two inks. The ink thicknesses can also be deduced from a three ink patch, provided that the surface coverages of all the inks are in the range 30% and 60% or that one ink thickness is known in advance and kept constant (e.g. a solid ink). One may also deduce ink thicknesses from patches with more than 3 inks, provided that only one, two or a maximum of three ink thicknesses are unknown and that the other ink thicknesses are known.

Although the disclosed printer control method is presented in the context of traditional offset and print on demand liquid ink printers, the method is also applicable for the control of printer actuation parameters influencing printer variables such as electrostatic charge and discharge of the photoconductor, charge of the toner particles, distance between toner supply and photoconductor, fixing time, fixing pressure, and fixing temperature in electrophotographic printers, heat intensity and duration in dye-sublimation printers or droplet size, droplet velocity and number of droplets per pixel in ink-jet printers. Fore more information on printer actuation parameters and printer variables see the book Output Hardcopy Devices, edited by R. C. Durbeck and S. Sherr, Academic Press, 1988, Chapter 10, Electrophotographic Printing, by A. B. Jaffe, D. M. Burland, pp 221-260, Chapter 12, Thermal Printing, by D. B. Dove, O. Sahni, 277-310 and Chapter 13, Ink Jet Printing, by W. L. Lloyd, H. H. Taub, 311-370.

System for Performing the Color Separation of Images

We disclose a system for performing the color separation of images. Two preferred embodiments are described in detail, but other embodiments may also perform the color separation of images.

Figure 5:
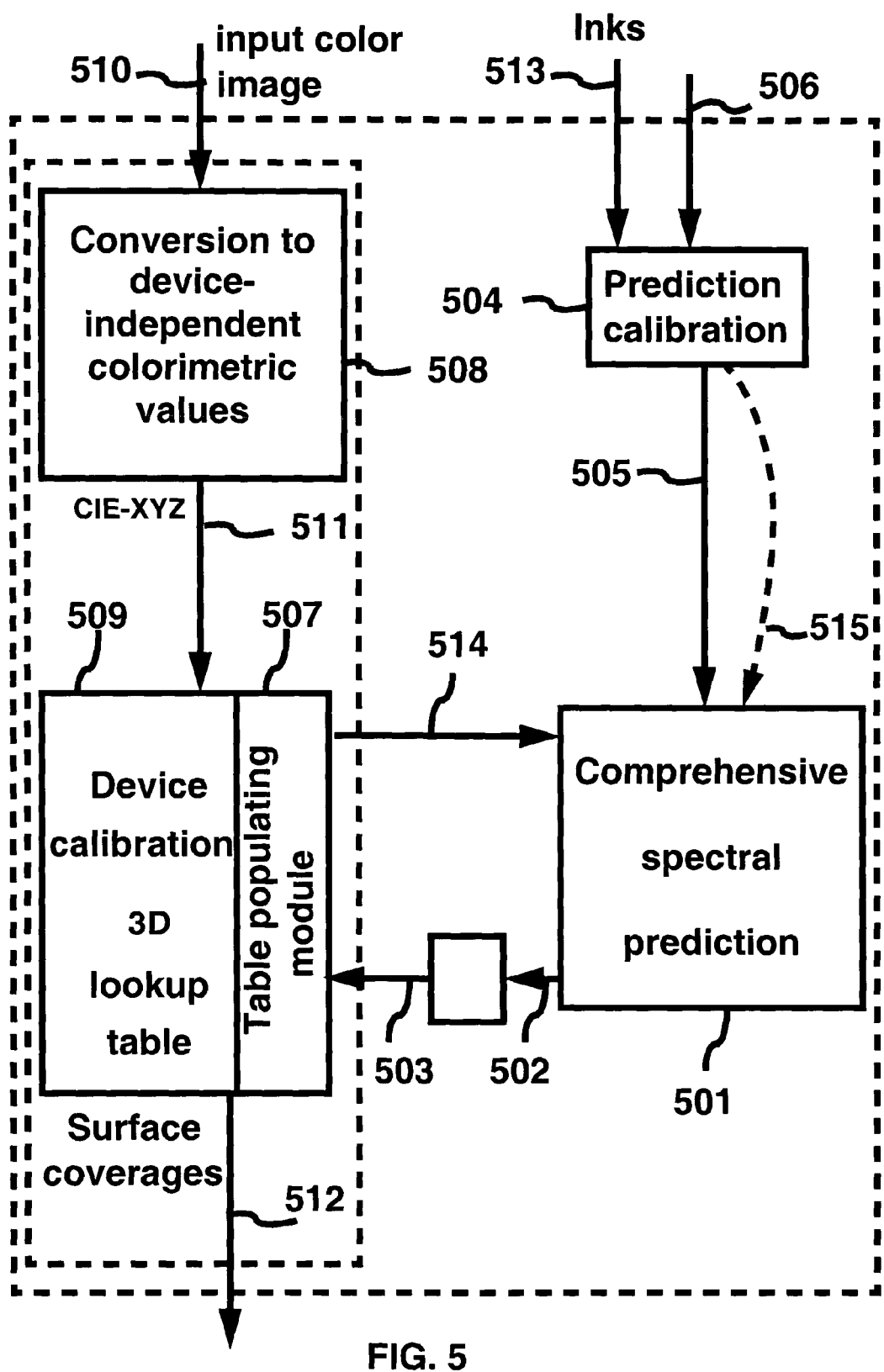
FIG. 5 illustrates a system operable for performing the color separation of an input image into coverages of inks relying on the disclosed comprehensive spectral prediction module for populating the device calibration lookup table.

(A) First Embodiment:

A system (example shown in FIG. 5) capable of performing the color separation of color images into a set of target inks comprises the following modules.

1. A comprehensive spectral color prediction module 501 for predicting reflection spectra 502 (and calorimetric tri-stimulus values 503) of halftone patches printed with nominal surface coverages 514 of a set of inks.

2. A comprehensive spectral prediction calibration module 504 for performing the calibration of the comprehensive spectral color prediction module 501. Calibration parameters 505 comprise the internal transmittances of the inks, the internal transmittance of the substrate (paper), the surface coverages of the inks alone and in superposition with one or several other inks, the relative ink thicknesses when two or more inks are superposed and the mapping of given nominal surface coverages to effective surface coverages.

3. A device calibration 3D lookup table populating module 507 for fitting nominal surface coverage values according to device-independent calorimetric tri-stimulus values associated to device calibration lookup table entries, by varying the surface coverages 514 provided to the comprehensive spectral prediction module 501. The populating module populates the device calibration lookup table by inserting the fitted nominal surface coverages at the corresponding entries of the device calibration lookup table.

4. A module 508 for converting device dependent colors (RGB) 510 to device independent colorimetric values (e.g. CIE-XYZ) 511 (see section 5.8, CRT Displays, Digital Color Imaging Handbook, Ed. G Sharma, CRC Press, 2003, pp. 324-328).

5. A device calibration 3D lookup table 509 operable for performing the color separation from device-independent calorimetric tri-stimulus values 511 to nominal coverages 512 of the target inks, possibly by interpolating between table entries of the previously populated device calibration lookup table.

The system receives as input a color image 510, for example given as red (R), green (G) and blue (B) display intensity values, as well as additional optional information 513 specifying the desired set of inks. For calibration purposes, it also receives as input 506 spectral reflectance measurements of the substrate (paper), of the solid inks and their superpositions printed on the substrate (paper), and of wedges of single inks printed alone and in superposition with all combinations of the other solid inks. Calibration parameters 505 (e.g. internal transmittances of the inks, internal transmittance of the substrate, the effective surface coverages of single ink wedges and of wedges printed in superposition with one or several other inks, and the relative ink thicknesses) are computed by the spectral prediction calibration module 504 from the input spectral reflection measurements 506 by interacting 515 with the comprehensive spectral prediction module 501. The device calibration lookup table populating module 507 populates the device calibration lookup table. By interacting with the comprehensive spectral prediction module 501, i.e. by varying the provided surface coverages 514, it fits ink surface coverages for the device-independent calorimetric tri-stimulus values of the table entries. During color separation, input image color values 510 are converted to device-independent colorimetric tristimulus values 511 and, by table lookup 509 and interpolation, corresponding ink surface coverages are obtained 512.

(B) Second Embodiment:

One may also think of a color separation system which, thanks to an extended lookup table, directly maps input image color coordinates 510 to coverages of inks 512. Instead of having entries specified as device-independent colorimetric values, the entries are formed by input image color coordinates sampled at given intervals, e.g. 0%, 10%, . . . , 90%, 100%. This is easily achieved, since a straightforward correspondence exists between input image coordinates (e.g. red, green, blue) and device-independent colorimetric tri-stimulus values (see section 5.8, CRT Displays, Digital Color Imaging Handbook, Ed. G Sharma, CRC Press, 2003, 324-328).

System for the Control of Printers and Printing Presses

Figure 6:
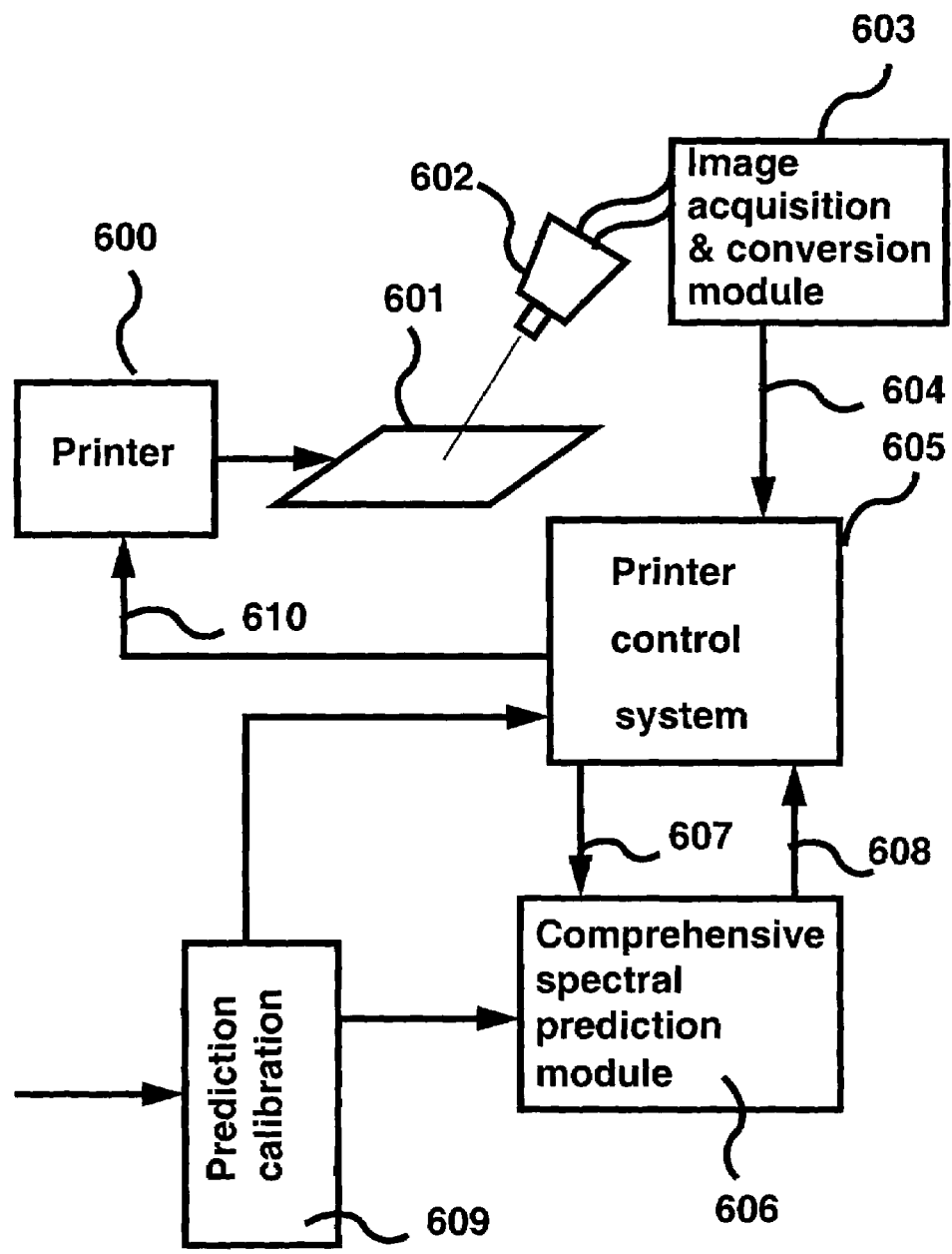
FIG. 6 illustrates a printer control system for controlling printer actuation parameters according to print parameters (surface coverages, ink thicknesses) inferred thanks to the disclosed comprehensive spectral prediction module.

The disclosed system (FIG. 6) for the control of printers (or printing presses) comprises the printer 600, printed pages 601, an image acquisition device 602, an image acquisition & conversion module 603, the printer control system 605, the comprehensive spectral prediction module 606 and the spectral prediction calibration module 609. The printer 600 may comprise several inking units for printing with multiple inks on the substrate (paper). Polychrome color elements located within a printed page 601 are acquired by the image acquisition means. This can be for example a camera or a scanner yielding red, green and blue sensor response values, a colorimeter yielding directly device-independent colorimetric values (e.g. CIE-XYZ) or a photospectrometer yielding reflection spectra. The image acquisition & conversion module 603 provides, according to state of the art methods, a conversion from red, green and blue camera sensor response values to device-independent calorimetric tri-stimulus values 604 (for the conversion between acquired red, green and blue sensor responses and CIE-XYZ value, see H. R. Kang, "Color Technology for Electronic Imaging Devices", SPIE Optical Engineering Press, 1997, pp. 282-285). The printer control system 605 fits print parameters such as ink thicknesses or surface coverages by varying the print parameters 607 provided to the comprehensive prediction module so as to obtain a predicted spectrum or a colorimetric tri-stimulus value 608 matching the input device-independent colorimetric tri-stimulus values 604 received from the image acquisition and conversion module 603. The fitted print parameters are compared with the print parameters obtained at calibration or print job starting time. The differences or functions of these differences 610 are transferred to the printer 600 and are used for controlling printer parameters. For example, the difference between the fitted ink thickness of a printed page during a print run and the initially fitted ink thickness is a control value for activating the ink flow regulators of the inking units within the printer. The comprehensive spectral prediction calibration module 609 works in the same way as described above, in section "System for performing the color separation of images". In a further embodiment, if the camera has known red, green and blue sensibility curves, the print parameters may be directly fitted by minimizing the sum of square differences between measured RGB sensor responses and predicted sensor responses. Predicted RGB sensor responses may be computed by simulating the RGB image acquisition device, said simulation comprising the vector—matrix multiplication between predicted spectrum 608 and the red, green and blue sensibility curves.

In the case of an image acquisition device yielding directly device-independent colorimetric tri-stimulus values (e.g. CIE-XYZ) or reflection spectra, print parameters 607 such as ink thicknesses and/or surface coverages may be directly fitted by the printer control system 605.

In the case that certain ink flows are stable, i.e. they provide equal ink amount per printed surface element, and that other ink flows are fluctuating, the control system may within its prediction model, keep the ink thicknesses associated to the stable ink flows constant and only fit those ink thicknesses which are associated with fluctuating ink flows. Corresponding thickness differences are then used to activate the regulators of the inking units whose fluctuating ink flows need to be controlled.

The disclosed control system is also applicable for the control of printer actuation parameters in electrophotographic printers (parameters acting on printer variables such as the electrostatic charge and discharge of the photoconductor, the charge of the toner particles, the distance between toner supply and photoconductor, the fixing time, pressure, and temperature), in thermal and dye-sublimation printers (parameters acting on printer variables such as the heat intensity and heat duration within the print head) and in ink-jet printers (parameters acting on printer variables such the pressure applied to the ink cavity, the droplet velocity, the droplet size, the number of successive droplets per printed dot, etc.).

Advantages

The present invention has a number of advantages over the prior art. The comprehensive spectral prediction model we disclose relies on physical print parameters such as internal transmission spectra, internal reflection spectrum of the paper, physical (mechanical) surface coverages for inks printed alone and in superposition with other inks and ink thicknesses. Thus, this model can be applied to control printer actuation parameters acting on printer variables such as the flow of ink, the pressure, and the temperature of the inking unit. Further printer actuation parameters, for example those controlling ink-jet printer variables (droplet velocity, droplet sizes, number of droplets/pixel etc.), those controlling electrophotographic printer variables (electrostatic charges, pressure and temperature during fusing) and those controlling thermal and dye-sublimation printer variables (head element temperature profiles) may be controlled by comparing initially established print parameters deduced from the comprehensive spectral prediction model and print parameters deduced from the comprehensive spectral prediction model at printing time.

Compared with prior art models, the disclosed comprehensive spectral prediction model enables to attain a higher prediction accuracy. Since its only free parameters are the surface coverages printed alone or in superposition with other solid inks, it is very stable and yields consistent results.

The comprehensive spectral prediction model allows to populate device calibration lookup tables in a much more efficient way, i.e. by printing only a small set of patches instead of the many patches required by state of the art techniques. This is especially useful for the recalibration of printers, e.g. when a different paper and/or a different set of inks is used for printing. In addition, since the comprehensive spectral prediction model allows to attain a colorimetric precision which is much higher than prior art techniques (see H. R. Kang, Applications of color mixing models to electronic printing, Journal of Electronic Imaging, Vol. 3, No. 3, July 1994, 276-287) printers with device calibration lookup tables populated thanks to the comprehensive spectral prediction model can print at a higher colorimetric precision, a decisive advantage for example for printers trying to produce photographic quality images.

The disclosed comprehensive spectral prediction model further provides improved solutions for the color separation of images when the inks comprise non-standard inks. It also provides improved solutions for undercolor removal (or gray component replacement), when printing with cyan, magenta, yellow and black inks.

The detailed improvements disclosed in the present invention are the following.

(1) The comprehensive spectral prediction model represents a considerable progress compared with the classical Clapper-Yule model by taking into account the fact that proportionally more incident light through a given colorant surface is reflected back onto the same colorant surface than onto other colorant surfaces. This is expressed by a factor b which specifies the part of the incident light which exits through the same colorant as the colorant from which it entered (lateral light propagation is short compared with the screen element period) and a factor (1−b) specifying the part of the incident light whose emerging light components may also exit from other colorants, with, in a preferred embodiment, a probability to exit from a given colorant equal to that colorant surface coverage (lateral light propagation is middle to large, compared with the screen element period). The disclosed comprehensive spectral prediction model comprises therefore one component weighted by factor b predicting reflection spectra by assuming that light exits from the same colorant as the colorant from which it enters and one component weighted by factor (1−b) predicting reflection spectra by assuming that light components may exit from any colorant.

(2) Within the comprehensive spectral prediction model, the new modelling of physical (also called mechanical) surface coverage takes into account surface coverages of inks printed alone or in superposition with other inks.

(3) The trapping effect is modeled by deducing the internal transmittances of superposed solid ink patches from measured reflectances of these patches and optionally, by computing the respective ink thicknesses of the contributing ink layers.

(4) The comprehensive spectral prediction model can be adapted to a large variety of printers, since it comprises separate mappings (functions mapping nominal to effective surface coverages) for single ink wedges printed alone, for single ink wedges printed in superposition with a second solid ink and possibly for single ink wedges printed in superposition with more than two inks.

(5) New weighting techniques are disclosed (expressed by equations 11 and 14) for weighting the different surface coverage mappings (coverage mapping functions) and obtaining the effective surface coverage of each ink within a polychromatic halftone patch. The different mappings within a polychromatic color halftone patch are weighted in proportion to the relative surface of their superposition conditions.

(6) Differences between initially deduced print parameters and print parameters inferred at printing time are computed thanks to the comprehensive spectral prediction model and allow to control the printing process by controlling relevant printer actuation parameters such ink flow, printing speed, pressure, distances, temperature, etc.

A further improvement of the present invention is the possibility of controlling printer actuation parameters without needing dedicated solid and halftone patches printed in the borders of printed pages. Constant color polychromatic halftone elements integrated within the printed page are sufficient to deduce surface coverages and ink thicknesses and therefore to provide a means of controlling relevant printer actuation parameters, such as ink flows, pressures, distances, temperatures, etc.

REFERENCES CITED

US Patents and Patent Applications

U.S. patent application Ser. No. 10/440,355, Reproduction of Security Documents and Color Images with Metallic Inks, filed 19th of Jun. 2003, inventors R. D. Hersch, P. Emmel, F. Collaud U.S. Pat. No. 4,852,485, Method of operating an autotypical color offset machine, inventor F. Brunner, issued Aug. 1, 1989

U.S. Pat. No. 5,031,534, Method and apparatus for setting up for a given print specification defined by a binary value representing solid color density and dot gain in an autotype printing run, inventor F. Brunner, issued Jul. 16, 1991

U.S. Pat. No. 5,734,800, Six color process system, inventor R. Herbert, issued Mar. 31, 1998

U.S. Pat. No. 5,402,253, Color Conversion Method and Apparatus with a Variable Gray Component Replacement Ratio, Inventor Seki, issued Mar. 28, 1995, U.S. Pat. No. 5,502,579 Color Image Processing Method and Apparatus Capable of Adjusting the UCR Ratio, inventors Kita, et. al., issued Mar. 26, 1996, U.S. Pat. No. 5,508,827, for Color Separation Processing Method and Apparatus for a Four Color Printer, inventor H. Po-Chieh, issued Sep. 3, 1996.

U.S. Pat. No. 5,734,800, Six-color process system, inventors R. Hebert and A. Di Bernardo, issued Mar. 31, 1998

U.S. Pat. No. 5,936,749, Method and apparatus for preparing special color separation, inventor I. Ikeda, issued Aug. 10, 1999,

OTHER REFERENCES

A. U. Agar, Model Based Separation for CMYKcm Printing, Proceedings of The Ninth IS&T/SID Color Imaging Conference, Scottsdale, Ariz., 2001, 298-302

S. Chosson, R. D. Hersch, "Visually-based color space tetrahedrizations for printing with custom inks", Proc. SPIE, Color Imaging: Device-Independent Color, Color Hardcopy, and Graphic Arts VI, January 2001, San Jose, SPIE Vol. 4300, 81-92

F. R. Clapper and J. A. C. Yule, The Effect of Multiple Internal Reflections on the Densities of Half-tone Prints on Paper, Journal of the Optical Society of America, Volume 43, Number 7, July 1953, pp. 600-603

M. E. Demichel, Procédé, Vol. 26, 1924, 17-21, 26-27 and D. R. Wyble, R. S. Berns, "A Critical Review of Spectral Models Applied to Binary Color Printing", Journal of Color Research and Application, Vol. 25, No. 1, February 2000, 4-19

Output Hardcopy Devices, edited by R. C. Durbeck and S. Sherr, Academic Press, 1988, Chapter 10, Electrophotographic Printing, A. B. Jaffe, D. M. Burland, pp 221-260, Chapter 12, Thermal Printing, D. B. Dove, O. Sahni, 277-310 and Chapter 13, Ink Jet Printing, W. L. Lloyd, H. H. Taub, 311-370.

R. D. Hersch, F. Collaud, P. Emmel, Reproducing Color Images With Embedded Metallic Patterns, Proc. SIGGRAPH 2003, Annual Conference Proceedings, ACM Trans. of Graphics, Vol 22, No. 3, to be published 27th of July, 2003

S. Inoue, N. Tsumara, Y Miyake, Measuring MTF of Paper by Sinusoidal Test Pattern Projection, Journal of Imaging Science and Technology, Vol. 41, No. 6, November/December 1997, 657-661

D. B. Judd, Fresnel reflection of diffusely incident light, Journal of Research of the National Bureau of Standards, Vol. 29, Nov. 42, 329-332

H. R. Kang, "Color Technology for Electronic Imaging Devices", SPIE Optical Engineering Press, 1997, pp. 8-12

H. R. Kang, "Color Technology for Electronic Imaging Devices", SPIE Optical Engineering Press, 1997, pp. 43-45, original reference: J. A. C. Yule, W. J. Nielsen, The penetration of light into paper and its effect on halftone reproductions, Proc. TAGA, Vol. 3, 1951, 65-76

H. R. Kang, Color Technology for Electronic Imaging Devices, SPIE Optical Engineering Press, 1997, pp. 55-63

H. R. Kang, Applications of color mixing models to electronic printing, Journal of Electronic Imaging, Vol. 3, No. 3, July 1994, 276-287

H. Kipphan, Handbook of Print Media, Springer-Verlag, 2001, p. 92

H. Kipphan, Handbook of Print Media, Springer-Verlag, 2001, pp. 103-105

P. Kubelka, "New contributions to the optics of intensely light-scattering material, part II: Non-homogeneous layers", Journal of the Optical Society of America, Vol. 44, 1954, 330-335

C. Nakamura and K. Sayanagi, Gray Component Replacement by the Neugebauer Equations, Proc. Neugebauer Memorial Seminar on Color Reproduction, SPIE Vol. 1184, 1989, pp. 50-63

S. I. Nin, J. M. Kasson, W. Plouffe, Printing CIELAB images on a CMYK printer using tri-linear interpolation, Conf. Color Copy and Graphic Arts, 1992, SPIE Vol. 1670, 316-324

W. H. Press, B. P. Flannery, S. A. Teukolsky, W. T. Fetterling, Numerical Recipes, Cambridge University Press, 1st edition, 1988, section 10.5, pp. 309-317

G Rogers, "A Generalized Clapper-Yule Model of Halftone Reflectance", Journal of Color Research and Application, Vol. 25, No. 6, December 2000, 402-407

J. L. Saunderson, Calculation of the color pigmented plastics, Journal of the Optical Society of America, Vol. 32, 1942, 727-736

CRT Displays, Digital Color Imaging Handbook, Ed. G Sharma, CRC Press, 324-328

A. Stanton, G. Raencic, Ink Trapping and Colorimetric Variation, Proc. TAGA 2001, 258-281

E. J. Stollnitz, V. Ostromoukhov, D. Salesin, Reproducing Color Images Using Custom Inks, Proc. of SIGGRAPH 98, in Computer Graphics Proceedings, Annual Conference Series, 1998, 267-274

D. R. Wyble, R. S. Berns, A Critical Review of Spectral Models Applied to Binary Color Printing, Journal of Color Research and Application, Vol. 25, No. 1, February 2000, 4-19

J. A. C Yule, Principles of Color Reproduction, J. Wiley, 1967, Chapter 11, Four-Color Printing and the Black Printer, 282-303

We claim:

1. A method for the control of printer actuation parameters relying on the computation of differences between initial values of relative ink thicknesses and inferred values of relative ink thicknesses obtained at printing time from polychromatic halftones, said relative ink thicknesses being deduced by using a spectral prediction model, said spectral prediction model comprising single ink transmittance spectra computed from measured solid ink patch reflection spectra, and transmittance spectra of superposed inks expressed as multiplications of contributing single ink transmission spectra raised to the power of their respective relative thicknesses, the method comprising the steps of:

(a) calibrating the spectral prediction model by calculating from spectral reflectance measurements of paper printed with a single solid ink said single ink transmittance spectra and by deducing from spectral measurements of ink halftones mappings of nominal surface coverages of ink halftones to effective surface coverages of ink halftones;

(b) inferring from measurements of paper printed with superposed solid inks using said spectral prediction model said initial values of relative thicknesses of said superposed solid inks;

(c) acquiring at printing time a triplet of color coordinates of a polychromatic halftone element;

(d) using said triplet of color coordinates for deducing from the calibrated spectral prediction model said inferred values of relative thicknesses;

(e) comparing the initial values of relative thicknesses with the inferred values of relative thicknesses; and (f) according to said comparison, acting on the printer actuation parameters.

2. The method of claim 1, where the spectral prediction model is a spectral prediction model accounting for ink spreading in different superposition conditions by having separate mappings of nominal surface coverages of ink halftones to effective surface coverages of ink halftones for single ink wedges printed alone and for single ink wedges printed in superposition with at least one second ink.

3. The method of claim 1, where acquiring at printing time a triplet of color coordinates is performed by a set of red, green and blue sensors.

4. The method of claim 1, where printer actuation parameters are parameters selected from the group of parameters controlling ink flow, printing speed, pressure, and temperature.

5. The method of claim 1, where printer actuation parameters are parameters selected from the group of parameters which (a) for ink-jet printers control printer variables selected from the group of droplet velocity, droplet size and number of droplets per pixel;

(b) for electrophotographic printers control printer variables selected from the group of electrostatic charge, electrostatic discharge, fusing pressure, fusing temperature, and fusing duration; and (c) for thermal and dye-sublimation printers control head element temperatures.

6. The method of claim 1, where the spectral prediction model comprises two components, one component predicting reflection spectra for light that enters and exits from a same colorant and one component predicting reflection spectra for light that exits from any colorant, where the halftone element period determines relative weights of said two components.

* * * * *